US012768402B2

(12) United States Patent
Doi et al.

(10) Patent No.: US 12,768,402 B2
(45) Date of Patent: Oct. 20, 2026

(54) BALL BEARING

(71) Applicant: MINEBEA MITSUMI Inc., Kitasaku-gun (JP)

(72) Inventors: Kota Doi, Kitasaku-gun (JP); Eiichi Yazawa, Kitasaku-gun (JP); Tomoyuki Takemura, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 19/104,259

(22) PCT Filed: Apr. 24, 2023

(86) PCT No.: PCT/JP2023/016099
§ 371 (c)(1),
(2) Date: Feb. 17, 2025

(87) PCT Pub. No.: WO2024/075327
PCT Pub. Date: Apr. 11, 2024

(65) Prior Publication Data

US 2026/0055791 A1 Feb. 26, 2026

(30) Foreign Application Priority Data

Oct. 6, 2022 (JP) ................................ 2022-161933

(51) Int. Cl.
*F16C 19/06* (2006.01)
*F16C 19/50* (2006.01)
(Continued)

(52) U.S. Cl.
CPC ............ *F16C 33/418* (2013.01); *F16C 19/06* (2013.01); *F16C 19/50* (2013.01); *F16C 33/416* (2013.01);
(Continued)

(58) Field of Classification Search
CPC ........ F16C 19/06; F16C 19/50; F16C 33/416; F16C 33/418; F16C 2361/31; F16H 49/001; F16H 2049/003; F16H 55/0833
See application file for complete search history.

(56) References Cited

U.S. PATENT DOCUMENTS 3,486,212 A 12/1969 Vannest
4,715,247 A 12/1987 Honda et al.
(Continued)

FOREIGN PATENT DOCUMENTS

DE 102004018868 B4 11/2004
DE 102007034091 A1 * 1/2009 ........... F16H 49/001
(Continued)

OTHER PUBLICATIONS

International Search Report for corresponding International Application No. PCT/JP2023/016099 mailed Jul. 18, 2023.
(Continued)

*Primary Examiner* — Phillip A Johnson
(74) *Attorney, Agent, or Firm* — Chrisman Gallo Tochtrop LLC

(57) ABSTRACT

A ball bearing prevents vibration of a cage while preventing deformation of the cage in strain wave gearing. A ball bearing includes an inner ring deformable, an outer ring deformable and installed outside the inner ring, a plurality of rolling elements having a spherical shape and provided between the inner ring and the outer ring, and a cage provided with a plurality of pockets respectively accommodating the plurality of rolling elements and separated by gaps in a circumferential direction. Each of the plurality of pockets includes a pocket surface spread about a pocket axial line extending in a radial direction, and a flange part protruding from the pocket surface toward the pocket axial line. The pocket surface is configured to accommodate the rolling element with a gap interposed between the pocket
(Continued)

1 surface and the rolling element, and the flange part is configured to come into contact with the rolling element positioned at at least a position of a minor radius of the inner ring from an inner side in the radial direction.

9 Claims, 22 Drawing Sheets

(51) Int. Cl.
*F16C 33/41* (2006.01)
*F16H 49/00* (2006.01)

(52) U.S. Cl.
CPC ........ *F16H 49/001* (2013.01); *F16C 2361/61* (2013.01)

(56) References Cited

U.S. PATENT DOCUMENTS

| | | | | | |
|---|---|---|---|---|---|
| 4,804,276 | A | 2/1989 | Olschewski | | |
| 4,838,712 | A | 6/1989 | Kubo | | |
| 2004/0234181 | A1 | 11/2004 | Kobayashi | | |
| 2013/0087413 | A1 | 4/2013 | Carter | | |
| 2013/0305864 | A1* | 11/2013 | Schaefer | ............... | F16H 49/001 74/412 R |
| 2016/0186809 | A1* | 6/2016 | Maeoka | ................ | F16H 49/001 384/523 |
| 2021/0268642 | A1* | 9/2021 | Kataoka | .............. | F16C 33/6681 |

FOREIGN PATENT DOCUMENTS

| | | | | | |
|---|---|---|---|---|---|
| GB | 2201471 | A | | 9/1988 | |
| JP | S42-25363 | B1 | | 12/1967 | |
| JP | 62072945 | A | * | 4/1987 | |
| JP | S62-072945 | A | | 4/1987 | |
| JP | H06-103060 | B2 | | 12/1994 | |
| JP | 2002333026 | A | | 11/2002 | |
| JP | 2003004047 | A | | 1/2003 | |
| JP | 2003042160 | A | | 2/2003 | |
| JP | 2017-194135 | A | | 10/2017 | |
| JP | 6326514 | B1 | * | 5/2018 | ............ F16C 33/585 |
| JP | 2018200112 | A | * | 12/2018 | |

OTHER PUBLICATIONS

Written Opinion for corresponding International Application No. PCT/JP2023/016099 dated Jul. 18, 2023.
Extended European Seach Report Issued In EP Application 23874463.5 Jul. 29, 2026.

* cited by examiner

5

6

BALL BEARING

CROSS REFERENCE TO RELATED APPLICATIONS

This application is a national stage entry of International Application No. PCT/JP2023/016099, filed on Apr. 24, 2023, which claims priority to Japanese Patent Application 2022-161933, filed on Oct. 6, 2022, which are incorporated herein by reference.

TECHNICAL FIELD

The present invention relates to a ball bearing.

BACKGROUND ART

As a speed reducer, strain wave gearing achieving a high reduction ratio is known. Some strain wave gearings include a wave generator including an outer peripheral surface having an elliptical shape. The wave generator includes an elliptical cam and a ball bearing provided at an outer peripheral surface of the elliptical cam. Inner and outer rings of the ball bearing are deformable and, as the elliptical cam rotates, outer peripheral surfaces of the inner and outer rings deform in a radial direction in accordance with an elliptical shape of the outer peripheral surface of the elliptical cam, creating a wave motion.

Due to this wave motion, a rolling space between the inner ring and the outer ring moves in the radial direction when viewed at a fixed position in the circumferential direction. That is, the rolling space is positioned at an outermost side in the radial direction at a position of a major axis of the elliptical cam, and the rolling space is positioned at an innermost side in the radial direction at a position of a minor axis of the elliptical cam. On the other hand, a cage of the ball bearing is a member having an annular shape and rigidity. Therefore, when the cage is supported (guided) by rolling elements having spherical bodies, the cage deforms. The cage may be damaged by this deformation. To prevent this damage, in the ball bearing of conventional strain wave gearing, the cage is not supported by the rolling elements, and the rolling elements are configured to be accommodated with relatively large clearance with respect to the cage. The cage of such a ball bearing is allowed to relatively move with respect to the rolling elements, and thus vibration occurs (refer to, for example, Patent Document 1).

CITATION LIST

Patent Literature

Patent Document 1: JP 6-103060 B

SUMMARY OF INVENTION

Technical Problem

Thus, in the ball bearing of conventional strain wave gearing, there is demand for a configuration preventing vibration of the cage while preventing deformation of the cage.

The present invention has been made in view of the above-described problems, and an object of the present invention is to provide, in the strain wave gearing, a ball bearing preventing vibration of a cage while preventing deformation of the cage.

Solution to Problem

To achieve the object described above, a ball bearing according to the present invention includes an inner ring being deformable, an outer ring being deformable and installed outside the inner ring, a plurality of rolling elements having a spherical shape and provided between the inner ring and the outer ring, and a cage provided with a plurality of pockets respectively accommodating the plurality of rolling elements and separated by gaps in a circumferential direction. Each of the plurality of pockets includes a pocket surface being a surface spread about an axial line extending in a radial direction, and a flange part being a portion protruding from the pocket surface toward the axial line. The pocket surface is configured to accommodate the rolling element with a gap interposed between the pocket surface and the rolling element, and the flange part is configured to come into contact with the rolling element positioned at at least a position of a minor radius of the inner ring from an inner side in the radial direction, or come into contact with the rolling element positioned at at least a position of a major radius of the inner ring from an outer side in the radial direction.

Advantageous Effects of Invention

According to the ball bearing according to the present invention, in strain wave gearing, it is possible to prevent vibration of a cage while preventing deformation of the cage.

DESCRIPTION OF EMBODIMENTS

Embodiments of the present invention are described below with reference to the drawings.

Figure 1:
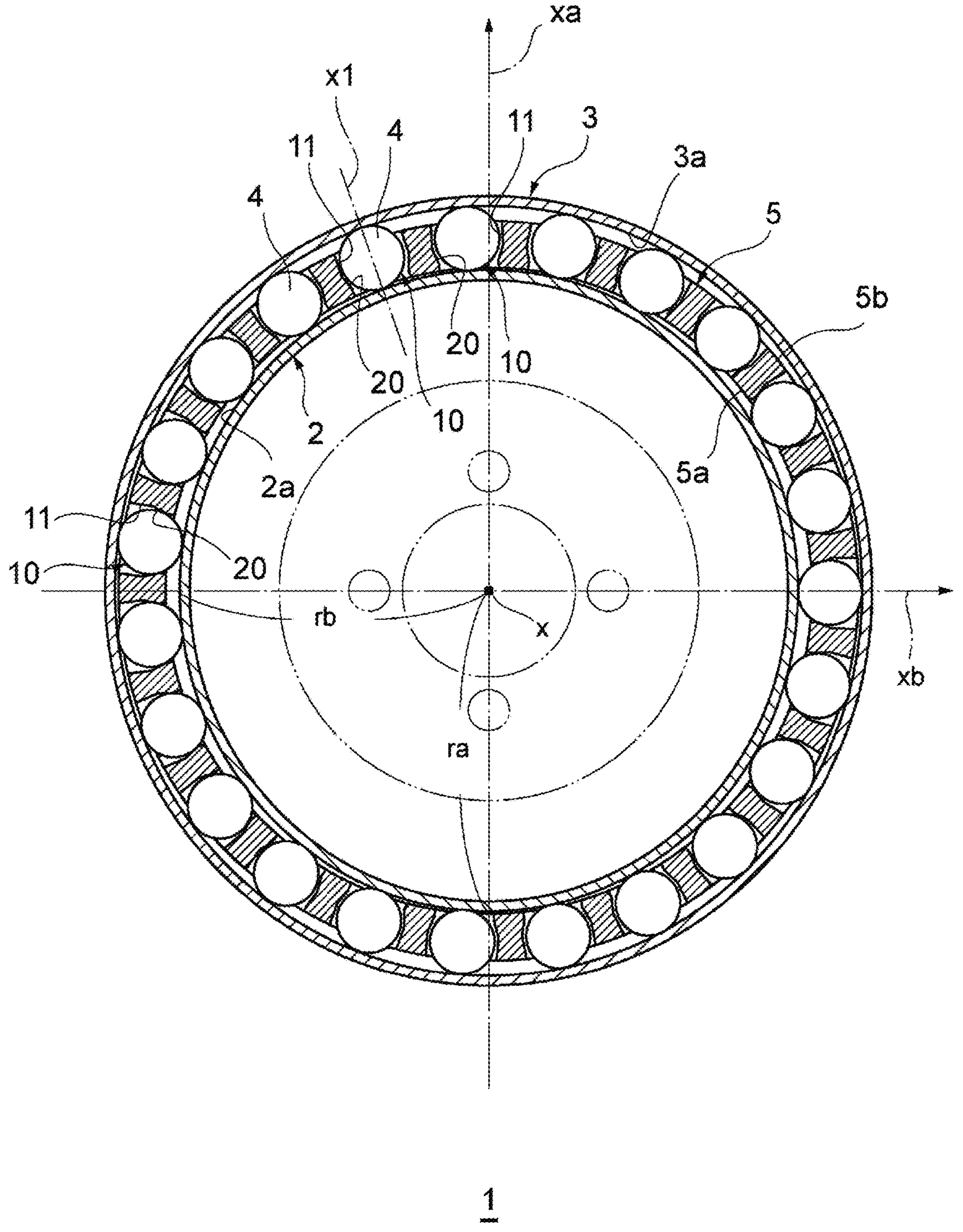
FIG. 1 is a partial cross-sectional view of a ball bearing according to a first embodiment of the present invention.

FIG. 1 is a partial cross-sectional view of a ball bearing 1 according to a first embodiment of the present invention. Note that, in FIG. 1, the ball bearing 1 is illustrated in a form when attached to a cam 102 of strain wave gearing 100 described below, the cam 102 having an elliptical shape. The ball bearing 1 includes an inner ring 2 being deformable, an outer ring 3 being deformable and installed outside the inner ring 2, a plurality of rolling elements 4 having spherical shapes and provided between the inner ring 2 and the outer ring 3, and a cage 5 provided with a plurality of pockets 10 respectively accommodating the plurality of rolling elements 4 and separated by gaps in a circumferential direction. Each of the plurality of pockets 10 includes a pocket surface 11 being a surface spread about a pocket axial line x1 extending in a radial direction, and a flange part 20 being a portion protruding from the pocket surface 11 toward the pocket axial line x1. The pocket surface 11 is configured to accommodate the rolling element 4 with a gap interposed between the pocket surface 11 and the rolling element 4, and the flange part 20 is configured to come into contact with the rolling element 4 positioned at at least a position of a minor radius rb of the inner ring 2 from an inner side in the radial direction or come into contact with the rolling element 4 positioned at at least a position of a major radius ra of the inner ring 2 from an outer side in the radial direction. Hereinafter, the ball bearing 1 will be specifically described. Note that FIG. 1 illustrates the ball bearing 1 as viewed from the front in a state of the inner ring 2 and the outer ring 3 being cut away and the cage 5 and the rolling elements 4 being fully exposed. Further, in the drawing, the rolling elements 4 are not all provided with reference signs, and likewise the pockets 10 are not all provided with reference signs. Similarly, in the drawing, the plurality of members are not all provided with reference signs, and reference signs are omitted as appropriate.

Figure 2:
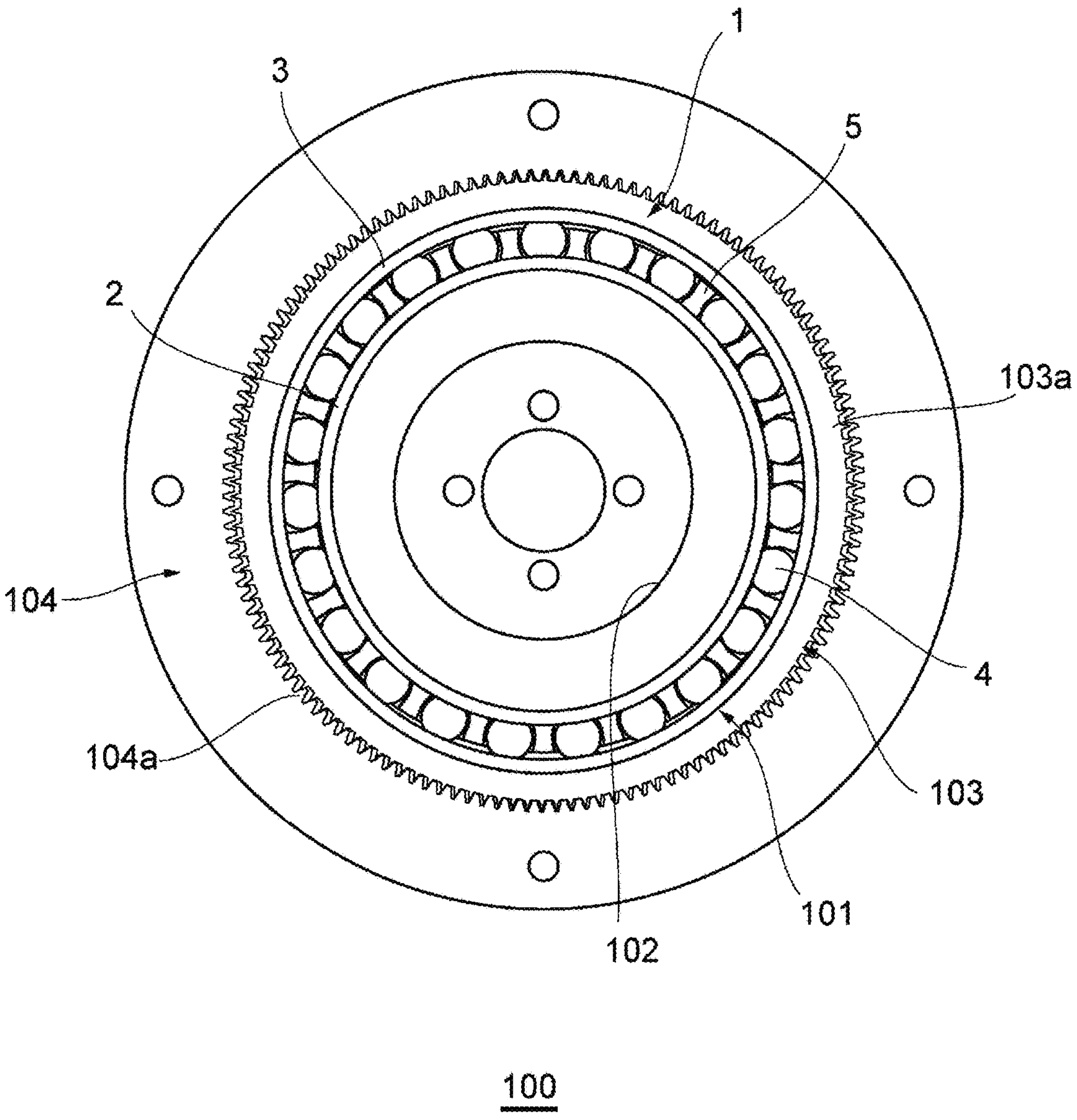
FIG. 2 is a view illustrating an example of strain wave gearing provided with the ball bearing illustrated in FIG. 1.

The ball bearing according to the present invention includes strain wave gearing as an application target, and is used in strain wave gearing. FIG. 2 is a view illustrating the strain wave gearing 100 as an example of strain wave gearing provided with the ball bearing 1. The ball bearing 1 constitutes part of a wave generator 101 of the strain wave gearing 100. In the wave generator 101, the cam 102 having an elliptical shape is fitted to the inner ring 2 of the ball bearing 1. The wave generator 101 is fitted to a flex spline 103 having a cup shape, and the flex spline 103 is fitted to a circular spline 104. In the strain wave gearing 100, the cam 102 is rotated, and the inner ring 2 of the ball bearing 1 is rotated together with the cam 102. As the inner ring 2 having an elliptical shape rotates, each part at an outer circumference side of the outer ring 3 is deformed in the radial direction by the rolling elements 4. At least a portion of the outer ring 3 positioned at the major axis comes into contact with the flex spline 103, and an outer peripheral surface of the flex spline 103 undergoes a wave motion. Teeth 103*a* positioned in a major axis direction of the flex spline 103 undergoing this wave motion mesh with teeth 104*a* of the circular spline 104, the circular spline 103 rotates relative to the flex spline 104 based on a difference between a number of the teeth 103*a* of the flex spline 103 and a number of the teeth 104*a* of the circular spline 104, and the flex spline 103 or the circular spline 104 rotates at a reduced speed relative to the rotation of the cam 102.

The inner ring 2 of the ball bearing 1 has a form similar to the form of an inner ring of a conventionally known ball bearing used in strain wave gearing, and is a flexible or an clastic member having a cylindrical or substantially cylindrical shape with an axial line x as a center axis or substantially center axis. When the cam 102 having an elliptical shape is fitted to the inner ring 2, the inner ring 2 deforms into an elliptical tubular or substantially elliptical tubular shape having the axial line x as a center axis or substantially center axis, as illustrated in FIG. 1. In the inner ring 2 fitted with the cam 102 having an elliptical shape, an outer peripheral surface 2*a*, being a surface of the inner ring 2 facing the outer side in the radial direction, is an elliptical tubular surface or substantially elliptical tubular surface having the axial line x as a center axis or substantially center axis, and a cross section of the outer peripheral surface 2*a* orthogonal to the axial line x forms an ellipse or substantially an ellipse having a major axis xa as the major axis, a minor axis xb as the minor axis, the major radius ra as the major radius, and the minor radius rb as the minor radius, as illustrated in FIG. 1. Note that the axial line x is the axial line of the ball bearing 1.

The outer ring 3 has a form similar to the form of an outer ring of a conventionally known ball bearing used in strain wave gearing, and is a member having flexibility or elasticity and a tubular shape about the axial line x as illustrated in FIG. 1. The outer ring 3, as illustrated in FIG. 1, has a shape similar to the shape of the inner ring 2 in the ball bearing 1. However, a raceway groove (not illustrated) is formed in each of the inner ring 2 and the outer ring 3, and in these raceway grooves, the inner ring 2 and outer ring 3 are not similar.

As illustrated in FIG. 1, the cage 5 is a member having an annular or substantially annular shape and rigidity with the axial line x as a center axis or substantially center axis. The cage 5 is made of, for example, resin. Note that the cage 5 is not limited to being made of resin, and may be made of another material. As described above, the cage 5 includes the plurality of pockets 10, and each pocket 10 accommodates the rolling element 4. Note that the ball bearing 1 has an odd number of the rolling elements 4 and, in the illustrated example, the ball bearing 1 has 23 rolling elements 4. Each pocket 10 extends along the pocket axial line x1 extending in the radial direction orthogonal to the axial line x, and penetrates the cage 5 between an inner peripheral surface 5*a* and an outer peripheral surface 5*b* of the cage 5. Note that the inner peripheral surface 5*a* is a surface facing an inner side of the cage 5 in the radial direction, and the outer peripheral surface 5*b* is a surface facing an outer side of the cage 5 in the radial direction. Further, a radius of the inner peripheral surface 5*a* of the cage 5 is larger than a major radius of the outer peripheral surface 2*a* of the inner ring 2, and a radius of the outer peripheral surface 5*b* of the cage 5 is smaller than a minor radius of the inner peripheral surface 3*a* of the outer ring 3 in the ball bearing 1.

Figure 3:
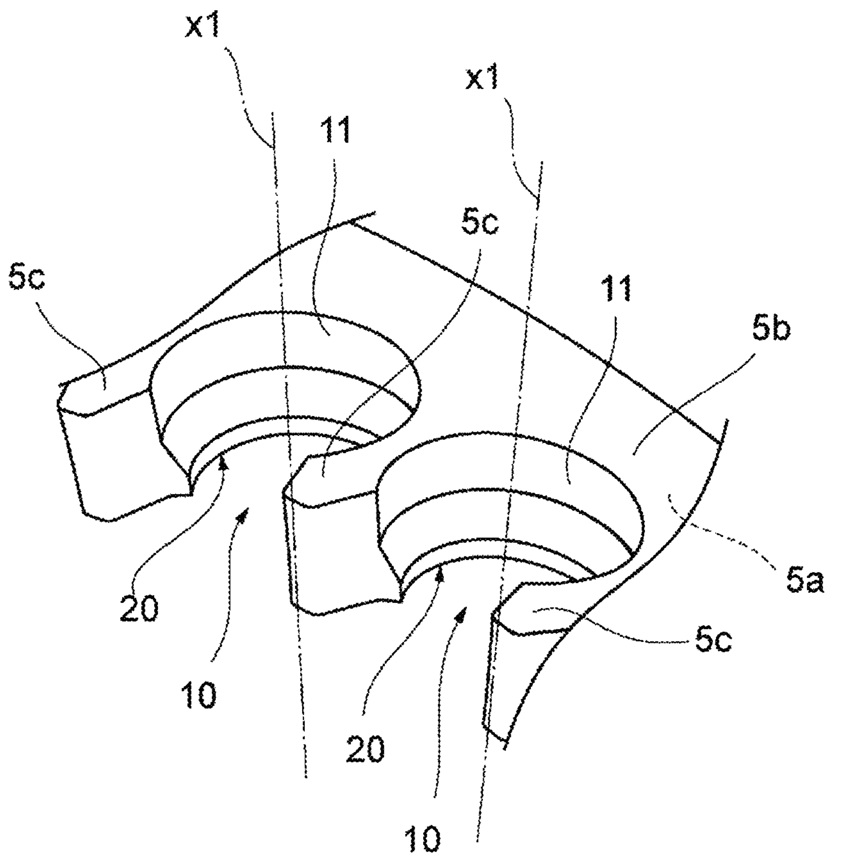
FIG. 3 is a partial perspective view of a cage in the ball bearing illustrated in FIG. 1.
Figure 4:
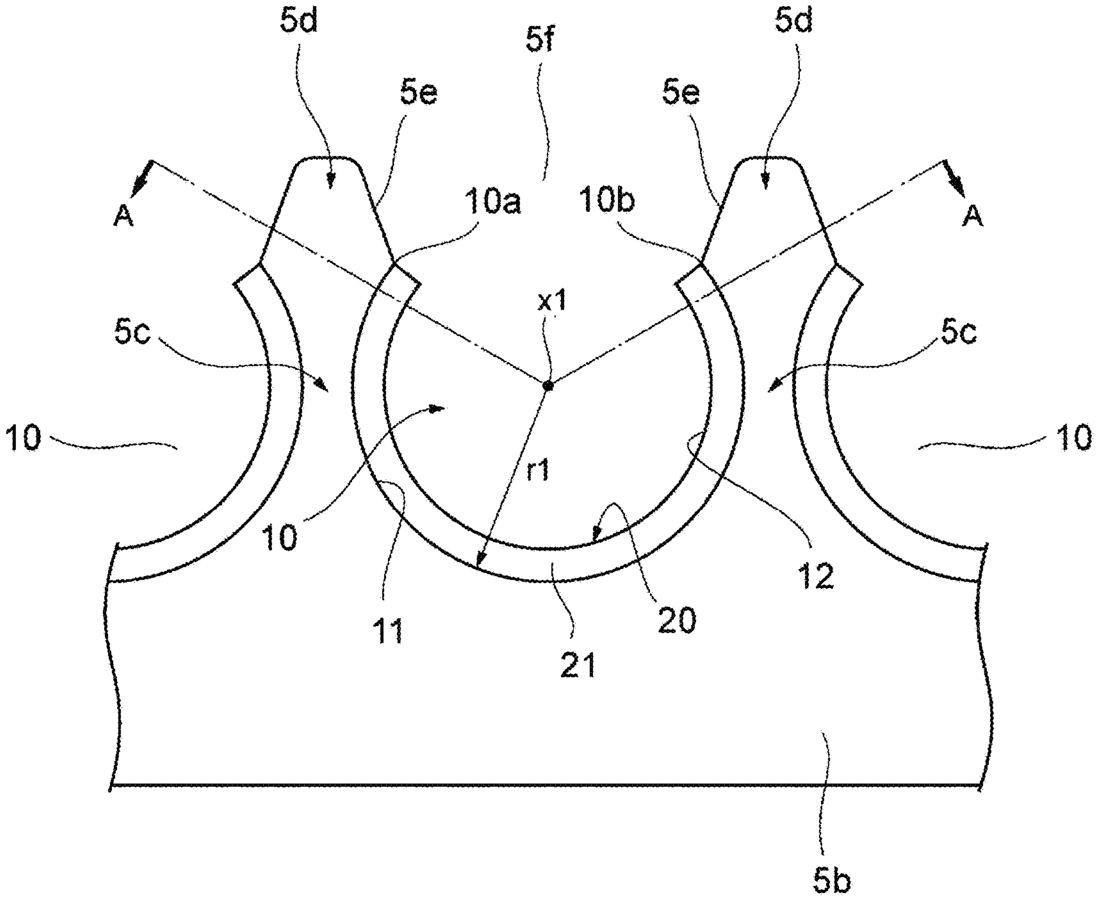
FIG. 4 is an enlarged view illustrating a pocket of the cage illustrated in FIG. 3.
Figure 5:
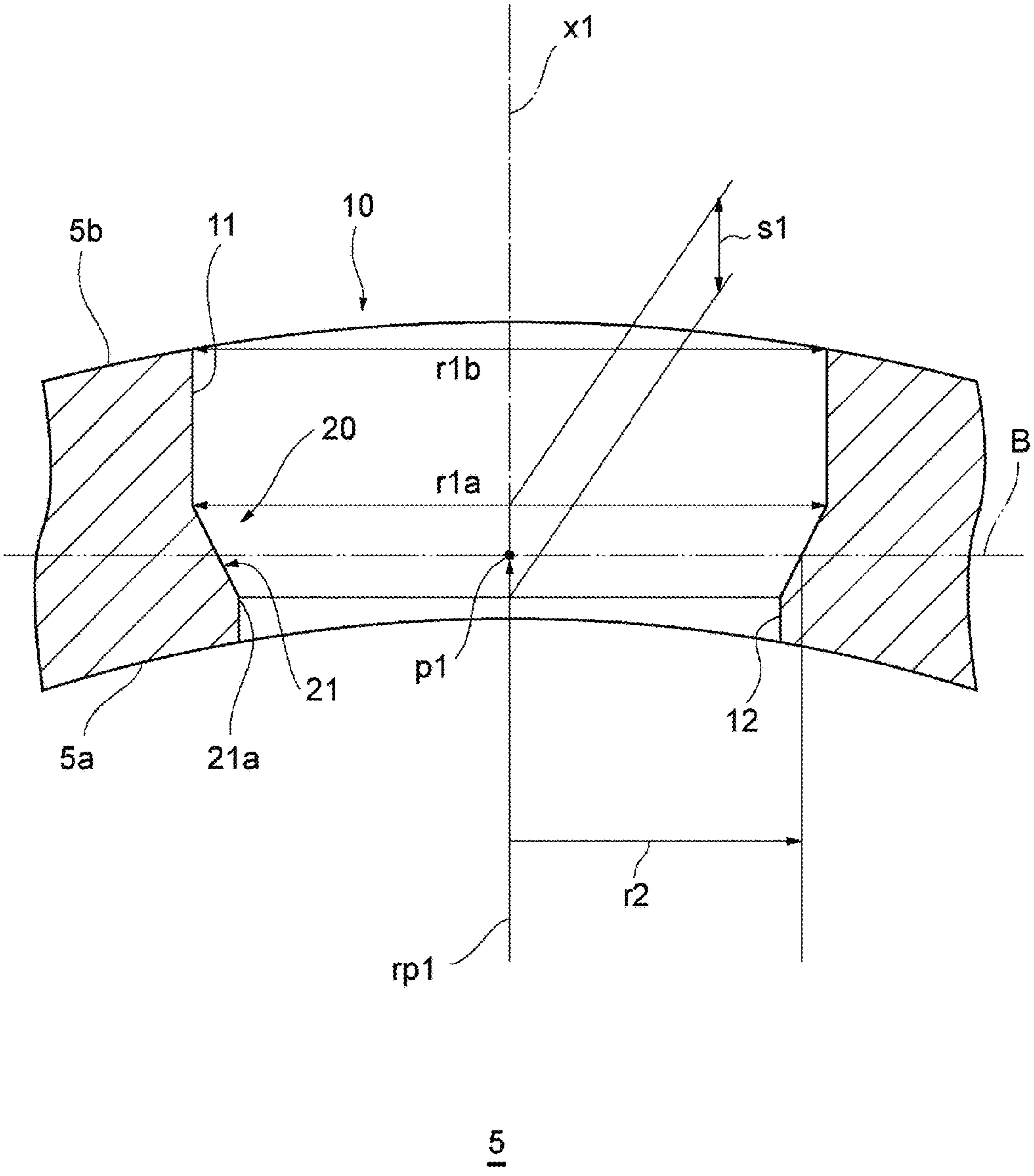
FIG. 5 is a cross-sectional view of the cage in a cross section taken along line A-A extending in a radial direction with respect to a pocket axial line of FIG. 4.

FIG. 3 is a partial perspective view of the cage 5, FIG. 4 is an enlarged view illustrating the pocket 10 of the cage 5, and FIG. 5 is a cross-sectional view of the cage 5 of a cross section taken along line A-A extending in the radial direction with respect to the pocket axial line x1 of FIG. 4. Note that FIG. 4 illustrates the pocket 10 when the pocket 10 is viewed from the outer peripheral surface 5*b* side toward the inner peripheral surface 5*a* side in the pocket axial line x1 direction. As illustrated in FIGS. 3, 4, the cage 5 includes a plurality of claw parts 5*c* extending along the axial line x. The claw parts 5*c* are formed separated by gaps in the circumferential direction about the axial line x, and each pocket 10 is formed between the claw parts 5*c* adjacent to each other in the circumferential direction. End parts (tip end parts 5*d*) at one side in the axial line x direction of the claw parts 5*c* adjacent to each other in the circumferential direction are not connected and form gaps, and each pocket 10 is open at one side in this axial line x direction. As illustrated in FIG. 4, between the tip end parts 5*d* of the claw parts 5*c* adjacent to each other in the circumferential direction, an opening part 5*f* opening the pocket 10 is formed by surfaces (opening surfaces 5*c*) of the tip end part 5*d* facing the circumferential direction. The opening surfaces 5*e* continue to the pocket surface 11 and the flange part 20 at the other side in the axial line x direction.

As illustrated in FIG. 3, the pocket axial line x1 of each pocket 10 extends, for example, parallel or substantially parallel to the radial direction, and the plurality of pockets 10 are provided, for example, at equiangular intervals or substantially equiangular intervals about the axial line x. Further, the pocket surface 11 of each pocket 10 is capable of accommodating the rolling element 4 with an intervening gap in a radial direction orthogonal to the pocket axial line x1 (hereinafter also referred to as a pocket radial direction), and a radius r1 of the pocket surface 11 (refer to FIG. 4) is larger than a radius of the rolling element 4. The pocket surface 11 is, for example, part of a conical surface, a cylindrical surface, or substantially cylindrical surface having the pocket axial line x1 as a center axis or substantially center axis. The pocket surface 11 may be part of a conical surface, a cylindrical surface, or a substantially cylindrical surface extending along a line close to the pocket axial line x1 passing through the axial line x or a point in the vicinity of the axial line x. The pocket surface 11 is capable of accommodating the rolling element 4 with an intervening gap across the entire range in the direction of the pocket axial line x1 and, for example, as illustrated in FIG. 5, a radius r1 of the pocket surface 11 is uniform across an entire range in the direction of the pocket axial line x1 (r1*a*=r1*b*) or increases from the flange part 20 side toward the outer peripheral surface 5*b* side in the pocket axial line x1 direction (r1*b*>r1*a*). Note that the radius r1*a* is the radius r1 of the pocket surface 11 at an end at the flange part 20 side, and the radius rib is the radius r1 of the pocket surface 11 at an end at the outer peripheral surface 5*b* side. Connection parts 10*a*, 10*b*, being portions respectively connecting the pocket surface 11 and the pair of opening surfaces 5*e*, are configured to keep the rolling element 4 accommodated in the pocket 10 from exiting the pocket 10 in the axial line x direction. For example, a gap between the connection part 10*a* and the connection part 10*b* is smaller than the radius of the rolling element 4.

As illustrated in FIGS. 4 and 5, the flange part 20 of each pocket 10 is a portion protruding inward in the pocket radial direction from the pocket surface 11 and extending around the pocket axial line x1 and, in the present embodiment, has such a form so as to come into contact with the rolling element 4 positioned at at least a position of the minor radius rb of the inner ring 2 from an inner side in the radial direction. Note that, as illustrated in FIG. 1, the rolling element 4, in the ball bearing 1, positioned at the position of the minor radius rb of the inner ring 2 is the rolling element 4 in contact with the outer peripheral surface 2*a* of the inner ring 2 at the position of the minor radius rb and with a center positioned on the minor axis xb of the inner ring 2. The flange part 20, when coming into contact with the rolling element 4 positioned at the position of the minor radius rb of the inner ring 2 from the inner side in the radial direction, for example, is configured not to allow the pocket 10 to relatively move with respect to the rolling element 4, whereby the cage 5 is supported by the rolling element 4. Note that the pocket 10 not allowed to relatively move with respect to the rolling element 4 means that the position of the rolling element 4 in the pocket 10 does not change, and the rotation of the rolling element 4 is not included in the relative movement of the pocket 10 with respect to the rolling element 4.

Figure 6:
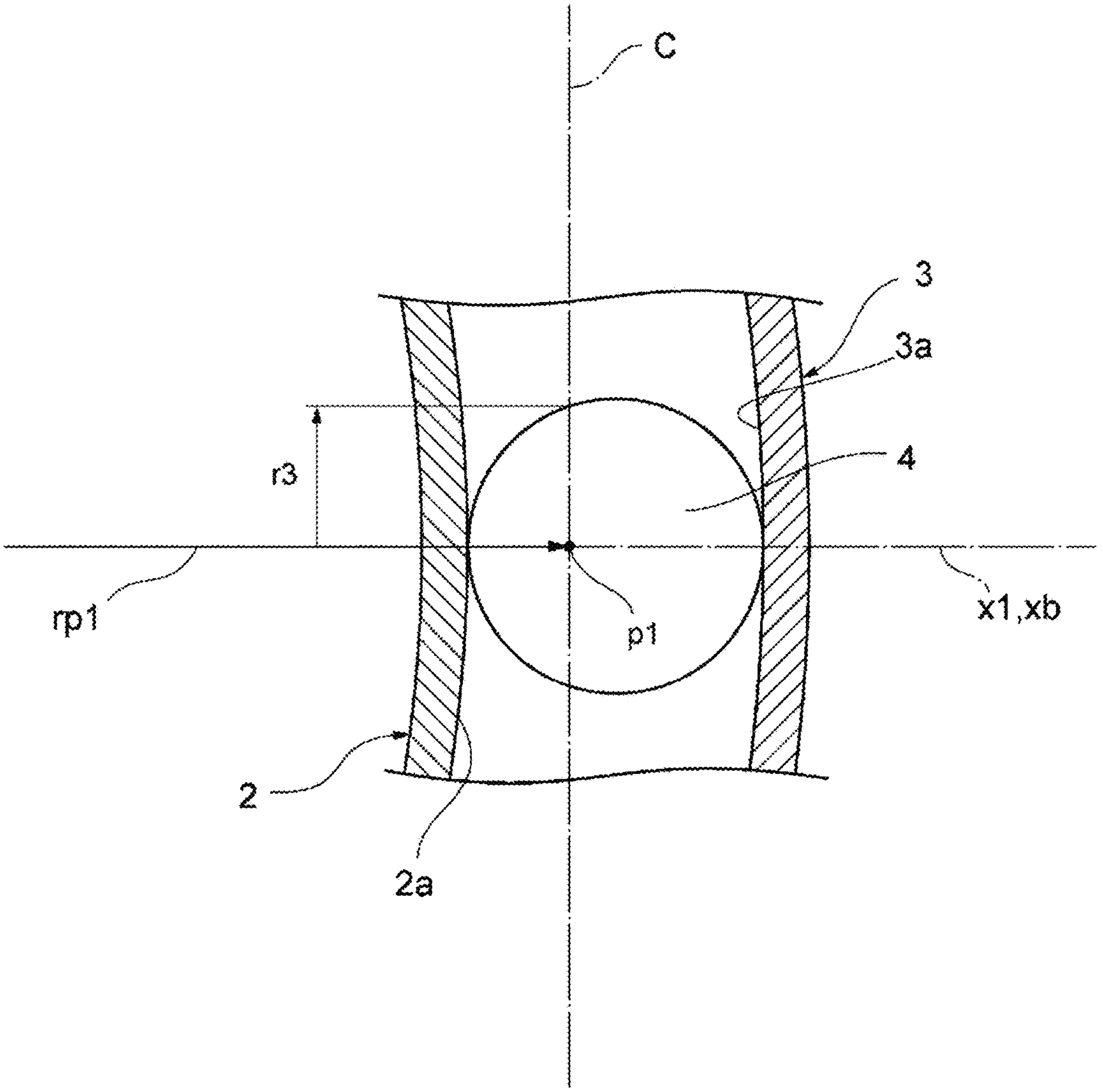
FIG. 6 is an enlarged view illustrating the vicinity of a rolling element positioned at a position of a minor radius of an inner ring of the ball bearing illustrated in FIG. 1.

For example, as illustrated in FIG. 5, at a predetermined radial direction position (position p1) in the radial direction (pocket axial line x1 direction) of the ball bearing 1 within a range (range s1) of the flange part 20 on the pocket axial line x1, a radius (radius r2) of the flange part 20 in a cross section (cross section B) orthogonal to the pocket axial line x1, and a radius (radius r3) of the rolling element 4 in a cross section (cross section C) orthogonal to the minor axis xb at the predetermined position p1 in the radial direction of the minor axis xb of the rolling element 4 positioned at the position of the minor radius rb of the inner ring 2 (refer to FIG. 6) are the same or substantially the same value. Note that FIG. 6 is an enlarged view illustrating the vicinity of the rolling element 4 positioned at the position of the minor radius rb of the inner ring 2 of the ball bearing 1. In FIG. 6, the cage 5 is omitted. Further, the cross section B and the cross section C are the same cross section in the ball bearing 1.

Specifically, for example, as illustrated in FIG. 5, the flange part 20 is provided at an inner side of the pocket surface 11 in the radial direction of the ball bearing 1 and adjacent to the pocket surface 11, and is provided only at an end part of the pocket 10 at an inner side in the pocket axial line x1 direction. Further, the flange part 20, specifically, for example, as illustrated in FIG. 5, includes an inclined surface 21. The inclined surface 21 is a surface extending about the pocket axial line x1 and increasing in diameter toward the side in the direction of contact with the rolling element 4 (outer side of the ball bearing 1 in the radial direction) in the pocket axial line x1 direction. Further, the flange part 20 continuously protrudes along the pocket surface 11 about the pocket axial line x1, for example. Specifically, for example, as illustrated in FIG. 4, the flange part 20 extends between the respective opening surfaces 5*c* of the pair of claw parts 5*c* along a circular ring or substantially circular ring extending about the pocket axial line x1, and extends longer than a semicircle. Further, as illustrated in FIG. 5, a shape of a cross section orthogonal to an extending direction of the flange part 20 is uniform or substantially uniform.

Figure 7:
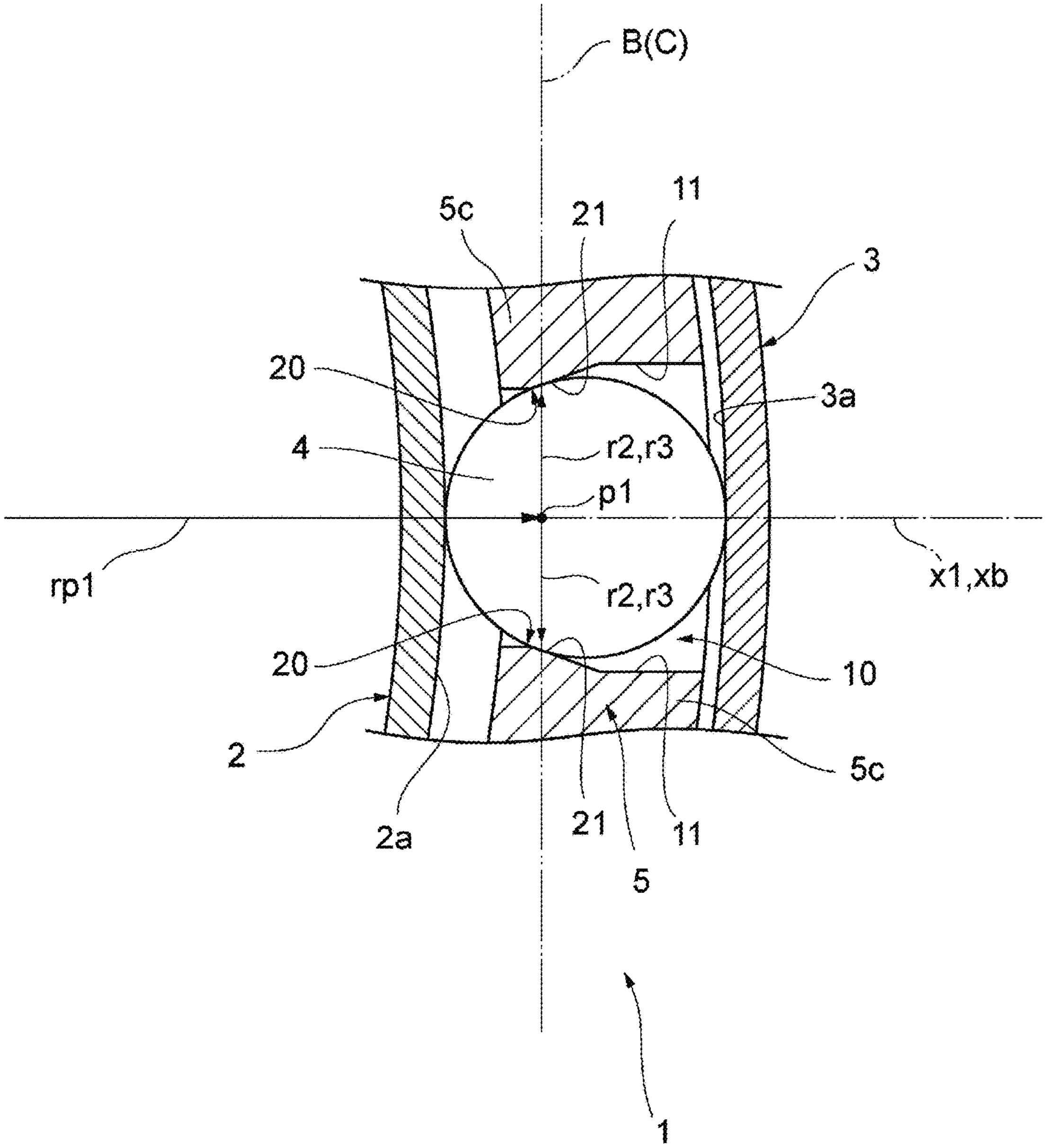
FIG. 7 is an enlarged view illustrating the vicinity of the rolling element positioned at a position of a minor axis of the inner ring in the ball bearing illustrated in FIG. 1.

As described above, in the inclined surface 21, as illustrated in FIG. 5, a range projected onto the pocket axial line x1 in the pocket radial direction is the range s1, and a radius in the cross section B at the position p1 in the radial direction within the range s1 is the radius r2. Further, in the ball bearing 1, as illustrated in FIG. 6, the radius r3 in the cross section C at the position p1 in the radial direction on the minor axis xb of the rolling element 4 positioned at the position of the minor radius rb of the inner ring 2 has the same or substantially the same value as the radius r2 of the inclined surface 21 of the flange part 20. Therefore, as illustrated in FIG. 7 described below, a portion of the radius r2 of the inclined surface 21 of the flange part 20 comes into contact with a portion of the radius r3 of a circumferential surface of the rolling element 4 positioned at the position of the minor radius rb of the inner ring 2 from an inner side of the ball bearing 1 in the radial direction. The position p1 is, for example, inward of a center of a width of the pocket 10 in the pocket axial line x1 direction. Note that, as illustrated in FIGS. 5, 6, a radius of the ball bearing 1 at the position p1 in the radial direction is rp1.

As illustrated in FIG. 5, for example, the inclined surface 21 of the flange part 20 is a tapered surface forming a straight line or substantially straight line in a cross section including the pocket axial line x1. The inclined surface 21 is not limited to such a tapered surface, and may be a surface having another shape as long as the surface comes into contact with the rolling element 4 positioned at at least the position of the minor radius rb of the inner ring 2 from the inner side in the radial direction of the ball bearing 1 at the position of the radius r2 at the position p1 in the radial direction as described above. For example, in the cross section including the pocket axial line x1, the inclined surface 21 may be a surface forming a circular arc or an arc protruding toward the pocket axial line x1 side, may be a surface forming a circular arc or an arc recessed toward a side opposite to the pocket axial line x1 side, or may be a surface forming another curve. Further, the inclined surface 21 may be a surface forming a line obtained by combining a curved line and a straight line in the cross section including the pocket axial line x1.

Further, as illustrated in FIG. 5, each pocket 10 may include a relief part 12 at an inner side of the flange part 20 in the pocket axial line x1 direction. The relief part 12 extends between an end at an inner side of the inclined surface 21 of the flange part 20 in the pocket axial line x1 direction (inner end 21*a*) and the inner peripheral surface 5*a* of the cage 5 and is, for example, part of the conical surface, the cylindrical surface, or the substantially cylindrical surface having the pocket axial line x1 as a center axis or substantially center axis. The form of the relief part 12 is not limited to this form. As with the pocket surface 11, the relief part 12 may be part of the conical surface, the cylindrical surface, or the substantially cylindrical surface extending along a line close to the pocket axial line x1 passing through the axial line x or a point in the vicinity of the axial line x, for example.

Figure 8:
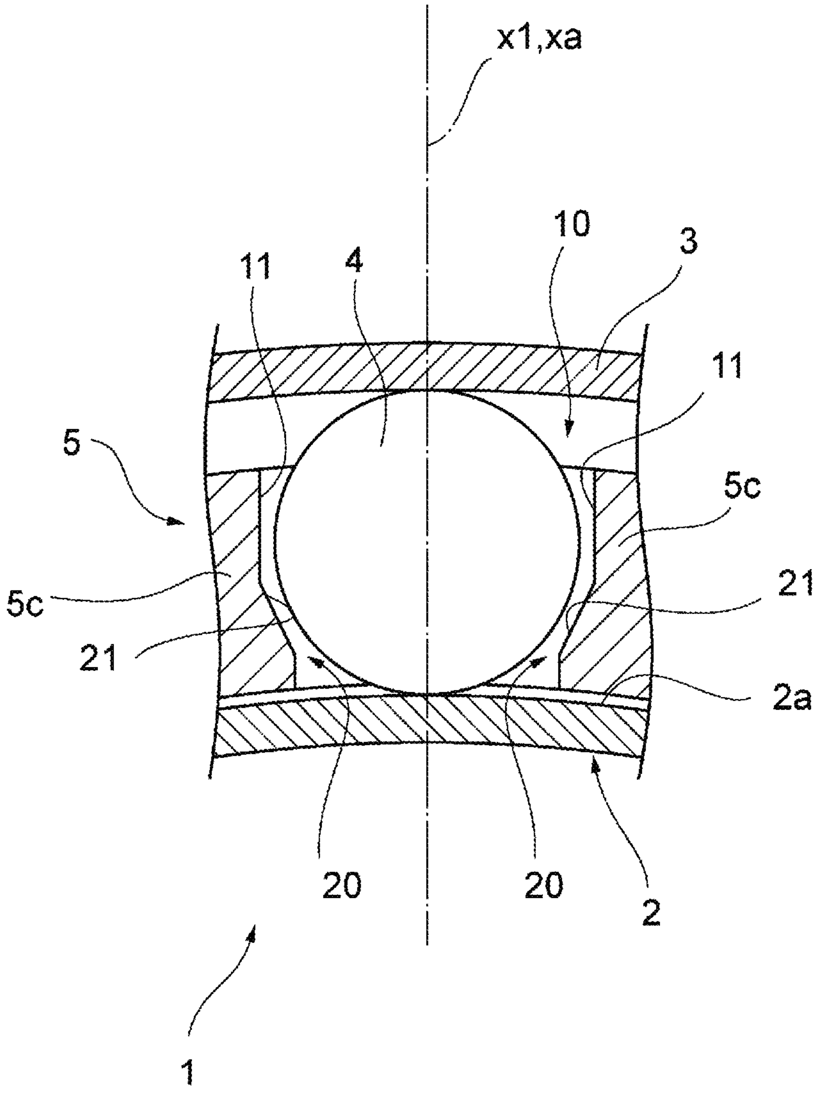
FIG. 8 is an enlarged view illustrating the vicinity of the rolling element positioned at a position of a major axis of the inner ring in the ball bearing illustrated in FIG. 1.

Next, an action of the ball bearing 1 having the configuration described above will be described. FIG. 7 is an enlarged view illustrating the vicinity of the rolling element 4 positioned at the position of the minor radius rb of the inner ring 2 in the ball bearing 1, and FIG. 8 is an enlarged view illustrating the vicinity of the rolling element 4 positioned at the position of the major radius ra of the inner ring 2 in the ball bearing 1.

In the strain wave gearing 100, when the cam 102 is rotated, the inner ring 2 rotates about the axial line x along with the rotation of the cam 102 and, as this inner ring 2 rotates, the cage 5 rotates about the axial line x along with the plurality of rolling elements 4. The outer peripheral surface 2*a* of the inner ring 2 has an elliptical shape, and each rolling element 4 traces an elliptical path about the axial line x. Each rolling element 4 is closest to the axial line x in the radial direction at the position of the minor radius rb of the inner ring 2. Then, the position of each rolling element 4 in the radial direction separates farther away from the axial line x with decreasing distance to the position of the major radius ra, and each rolling element 4 becomes most separated from the axial line x in the radial direction at the position of the major radius ra of the inner ring 2. Then, the position of each rolling element 4 in the radial direction moves closer to the axial line x with decreasing distance to the position of the minor radius rb. The rolling element 4 repeatedly moves in the radial direction in this manner while traveling around the outer peripheral surface 2*a* of the inner ring 2.

On the other hand, the cage 5 is a member having an annular shape and rigidity, and each pocket 10 of the cage 5 traces a circular path about the axial line x. That is, the position of each pocket 10 of the cage 5 in the radial direction from the axial line x does not change or substantially does not change with the rotation of the cage 5 and is constant. Therefore, each of the rolling elements 4 traveling on the outer peripheral surface 2*a* of the inner ring 2 relatively moves with respect to the pocket 10 in the pocket axial line x1 direction within the pocket 10 accommodating the rolling element 4. Each rolling element 4 relatively moves to an innermost side in the pocket axial line x1 direction with respect to the pocket 10 at the position of the minor radius rb of the inner ring 2, and relatively moves to an outermost side in the pocket axial line x1 direction with respect to the pocket 10 at the position of the major radius ra of the inner ring 2.

As illustrated in FIG. 7, the rolling element 4 positioned at the position of the minor radius rb of the inner ring 2 and relatively moved to the innermost side in the pocket axial line x1 direction with respect to the pocket 10 comes into contact with the inclined surface 21 of the flange part 20 of the pocket 10. Specifically, a portion of the radius r2 of the inclined surface 21 on the cross section B (C) at the position p1 at the radius rp1 distance from the axial line x in the radial direction and a portion of the radius r3 of the rolling element 4 on the cross section C (B) at the position p1 at the radius rp1 distance from the axial line x in the radial direction come into contact with each other. With this contact between the flange part 20 and the rolling element 4, the cage 5 is supported by the rolling element 4 and is not allowed to relatively move with respect to the rolling element 4 in the pocket radial direction and outward of the ball bearing 1 in the radial direction.

When the rolling element 4 is positioned at one position of the minor radius rb of the inner ring 2 on the raceway of the rolling element 4 (right side in FIG. 1) as illustrated in FIG. 7, another rolling element 4 is not positioned at the other position of the minor radius rb of the inner ring 2 on the raceway of the rolling element 4 (left side in FIG. 1). However, two of the rolling elements 4 are positioned in the vicinity of the other position of the minor radius rb of the inner ring 2 on the raceway of the rolling element 4 (left side in FIG. 1), and these two rolling elements 4 act or one of these two rolling elements 4 acts as described above in substantially the same way as the rolling element 4 positioned at the position of the minor radius rb of the inner ring 2. As described above, the cage 5 is not constrained from movement toward the other side (left side in FIG. 1) in the minor axis xb direction by the rolling element 4 in contact at the one position (right side in FIG. 1) on the minor axis xb, but is substantially constrained from relative movement toward the other side (left side in FIG. 1) in the minor axis xb direction by at least one of the two rolling elements 4 positioned in the vicinity of the other (left side in FIG. 1) position on the minor axis xb. Therefore, the cage 5 is constrained in movement in the ball bearing 1 by the contact between the one rolling element 4 positioned at the position of the minor radius rb of the inner ring 2 as well as the one or two rolling elements 4 positioned in the vicinity of the position of the minor radius rb of the inner ring 2 and the respective flange parts 20 of one pocket 10 positioned on the minor axis xb of the inner ring 2 and one or two pockets 10 positioned in the vicinity of the minor axis xb of the inner ring 2. Thus, the cage 5 is constrained in movement in the ball bearing 1 by the contact between the two or three rolling elements 4 respectively sequentially moving to the position of the minor radius rb of the inner ring 2 and the vicinity of the position and the respective two or three flange parts 20 respectively sequentially moving on the minor axis xb of the inner ring 2 and in the vicinity of the minor axis xb.

On the other hand, when the rolling element 4 positioned at the position of the minor radius rb of the inner ring 2 moves from the position of the minor radius rb to a position side of the major radius ra as the inner ring 2 rotates, the contact between this moving rolling element 4 and the flange part 20 of the pocket 10 accommodating this rolling element 4 is released, and the support of the cage 5 by the rolling element 4 is released.

As described above, at the position of the major radius ra of the inner ring 2, each rolling element 4 relatively moves to the outermost side in the pocket axial line x1 direction with respect to the pocket 10 accommodating the rolling element 4. That is, as illustrated in FIG. 8, the rolling element 4 positioned at the position of the major radius ra of the inner ring 2 moves to a position farthest from the inclined surface 21 of the flange part 20 of the pocket 10.

Thus, in the ball bearing 1, the cage 5 is supported only by the rolling elements 4 positioned in the vicinity of the minor radius rb of the inner ring 2. As a result, in the use state of the ball bearing 1 being rotated, it is possible to suppress generation of a force causing deformation of the cage 5. Further, in the ball bearing 1, as illustrated in FIG. 7, the flange part 20 and the rolling element 4 come into contact at a portion of the radius r2 of the inclined surface 21 and a portion of the radius r3 of the rolling element 4 in the cross section B (C) at the same position p1 of the radius rp1. Therefore, a force causing deformation of the cage 5 is not generated by the contact between the flange part 20 and the rolling element 4. Accordingly, in the ball bearing 1, the cage 5 is not deformed in the use state.

When the position of the flange part 20 coming into contact with the rolling element 4 positioned at the position of the minor radius rb of the inner ring 2 becomes the position of the radius of the inclined surface 21 in the cross section at a position outward of the position p1 of the radius rp1 in the radial direction due to manufacturing errors, assembly errors, or the like, a force causing deformation of the cage 5 at the axial line x side is generated in the cage 5 at the position of the minor axis xb. When the cage 5 is deformed by this force, the cage 5 bends at the position of the major axis xa and increases in curvature, and the gap in the circumferential direction of the pocket 10 on the major axis xa narrows. In particular, a width, in the circumferential direction, of the flange part 20 positioned at the inner side in the radial direction, at the position of the inclined surface 21, narrows. On the other hand, as described above, the rolling element 4 positioned at the position of the major radius ra of the inner ring 2 relatively moves to the outermost side in the pocket axial line x1 direction with respect to the pocket 10 accommodating the rolling element 4, and moves to the position farthest from the inclined surface 21 of the flange part 20 of the pocket 10. Therefore, even if, for example, the cage 5 deforms by the contact between the rolling element 4 on the minor axis xb and the flange part 20 as described above, it is possible to avoid or suppress the pressing of the pocket 10 on the major axis xa against the rolling element 5, avoid or suppress further deformation of the cage 5, and avoid or suppress damage to the cage 5.

Further, in the use state of the ball bearing 1, the cage 5 does not come into contact with the inner ring 2 or the outer ring 3, making it possible to prevent an increase in torque resistance of the ball bearing 1. Further, in this respect as well, deformation of the cage 5 in the use state is avoided or suppressed, and damage to the cage 5 is avoided or suppressed.

As described above, the flange part 20 of the pocket 10 of the ball bearing 1 can constrain the movement of the cage 5 in the ball bearing 1, and can prevent or reduce vibration of the cage 5 in the ball bearing 1. Further, the pocket 10 of the ball bearing 1 can suppress deformation of the cage 5.

As described above, when the rolling element 4 is positioned at the one position of the minor radius rb of the inner ring 2 on the raceway of the rolling element 4, the two rolling elements 4 positioned in the vicinity of the other position of the minor radius rb of the inner ring 2 on the raceway of the rolling element 4 act in substantially the same way as the rolling element 4 positioned at the position of the minor radius rb of the inner ring 2. However, at least one of these two rolling elements 4 positioned in the vicinity of the other position of the minor radius rb of the inner ring 2 on the raceway of the rolling element 4 may be configured to act in the same way as the rolling element 4 positioned at the position of the minor radius rb of the inner ring 2. Specifically, the rolling element 4 positioned at the one position of the minor radius rb of the inner ring 2 on the raceway of the rolling element 4 and at least one of the two rolling elements 4 positioned in the vicinity of the other position of the minor radius rb of the inner ring 2 on the raceway of the rolling element 4 may be configured to come into contact with the flange part 20 of the pocket 10.

Thus, according to the ball bearing 1 according to the first embodiment of the present invention, in the strain wave gearing 100, it is possible to prevent vibration of the cage 5 while preventing deformation of the cage 5.

Figure 9:
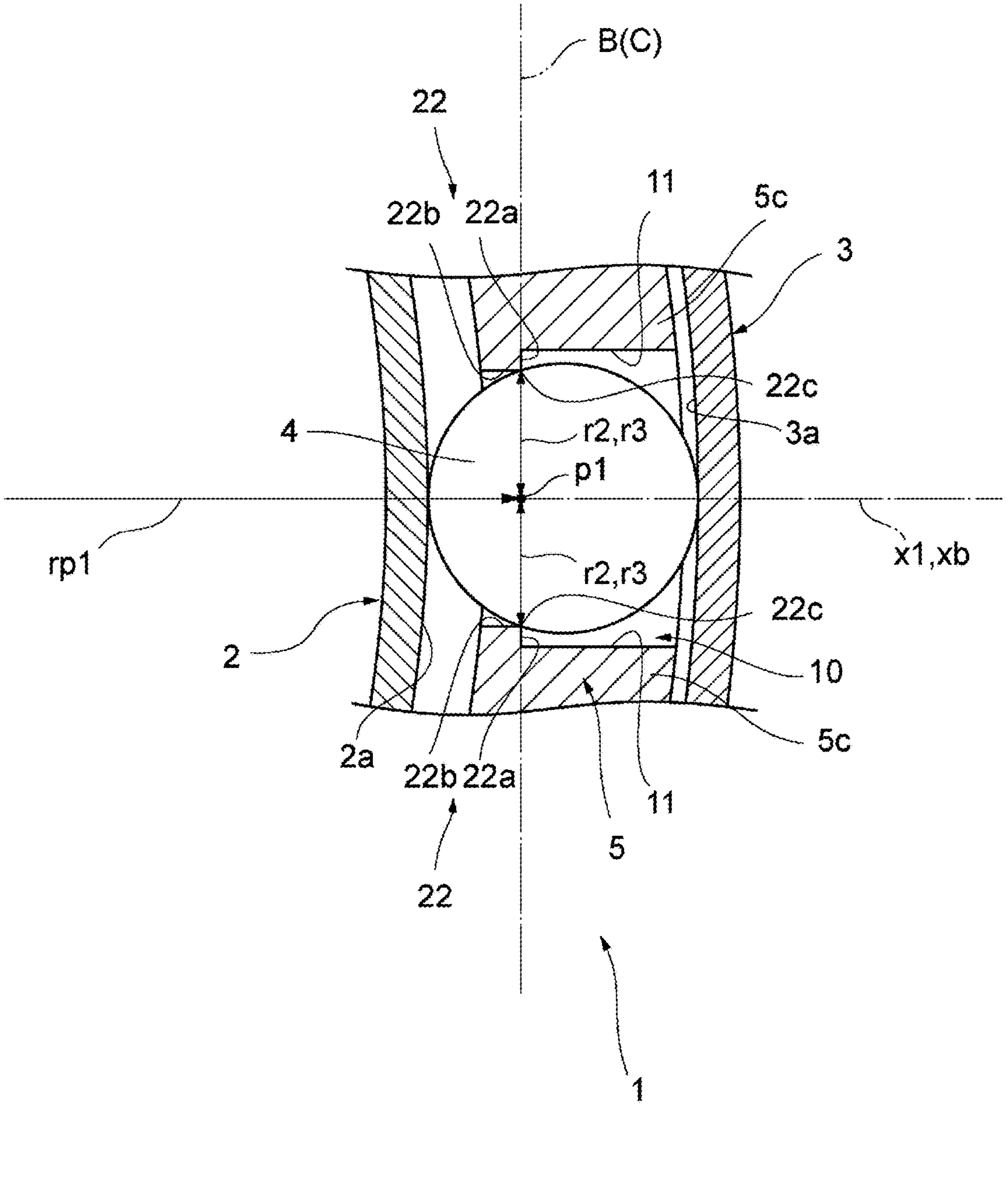
FIG. 9 is a view for illustrating a modified example of a flange part of the ball bearing according to the first embodiment of the present invention.

Next, a modified example of the flange part 20 of the ball bearing 1 according to the first embodiment of the present invention described above will be described. FIG. 9 is a view illustrating the modified example of the flange part 20 of the ball bearing 1, and is an enlarged view illustrating the vicinity of the rolling element 4 positioned at the position of the minor radius rb of the inner ring 2 of the ball bearing 1. As illustrated in FIG. 9, the flange part 20 of the ball bearing 1 may include a stepped surface 22 instead of the inclined surface 21 described above. The stepped surface 22 includes an annular surface 22*a* and a tubular surface 22*b*. The annular surface 22*a* is a surface having an annular shape about the pocket axial line x1 extending inward in the pocket radial direction from an end of the pocket surface 11 at the inner side in the pocket axial line x1 direction. The tubular surface 22*b* extends along the pocket axial line x1 extending from an end of the annular surface 22*a* at the inner side of the pocket radial direction to the inner peripheral surface 5*a* at the inner side in the pocket axial line x1 direction.

The annular surface 22*a* is a surface extending along a plane orthogonal to the pocket axial line x1 and, as illustrated in FIG. 9, for example, is a surface parallel or substantially parallel to the plane orthogonal to the pocket axial line x1, and is part of an annular surface or substantially annular surface having the pocket axial line x1 as a center axis or substantially center axis. Further, the tubular surface 22*b* is part of a tubular surface extending along the pocket axial line x1, and is, for example, part of the conical surface, the cylindrical surface, or the substantially cylindrical surface having the pocket axial line x1 as a center axis or substantially center axis. The tubular surface 22*b* may be part of the conical surface, the cylindrical surface, or the substantially cylindrical surface extending along a line close to the pocket axial line x1 passing through the axial line x or a point in the vicinity of the axial line x, for example. The annular surface 22*a* and the tubular surface 22*b* extend continuously between the connection part 10*a* and the connection part 10*b* (refer to FIG. 4).

A connection part 22*c*, being a portion connecting the annular surface 22*a* and the tubular surface 22*b*, is positioned in the cross section B at the position p1 of the radius rp1 described above and extends on a circular ring centered on the pocket axial line x1. A radius of the connection part 22*c* in the pocket radial direction is the radius r2. Therefore, at the connection part 22*c*, similarly to the inclined surface 21 of the flange part 20 described above, the stepped surface 22 of the flange part 20 comes into contact with the rolling element 4 positioned at at least the position of the minor radius rb of the inner ring 2, and the cage 5 is supported. Accordingly, the stepped surface 22 of the flange part 20 according to the present modified example also acts in the same manner as the inclined surface 21 of the flange part 20 described above.

Figure 10:
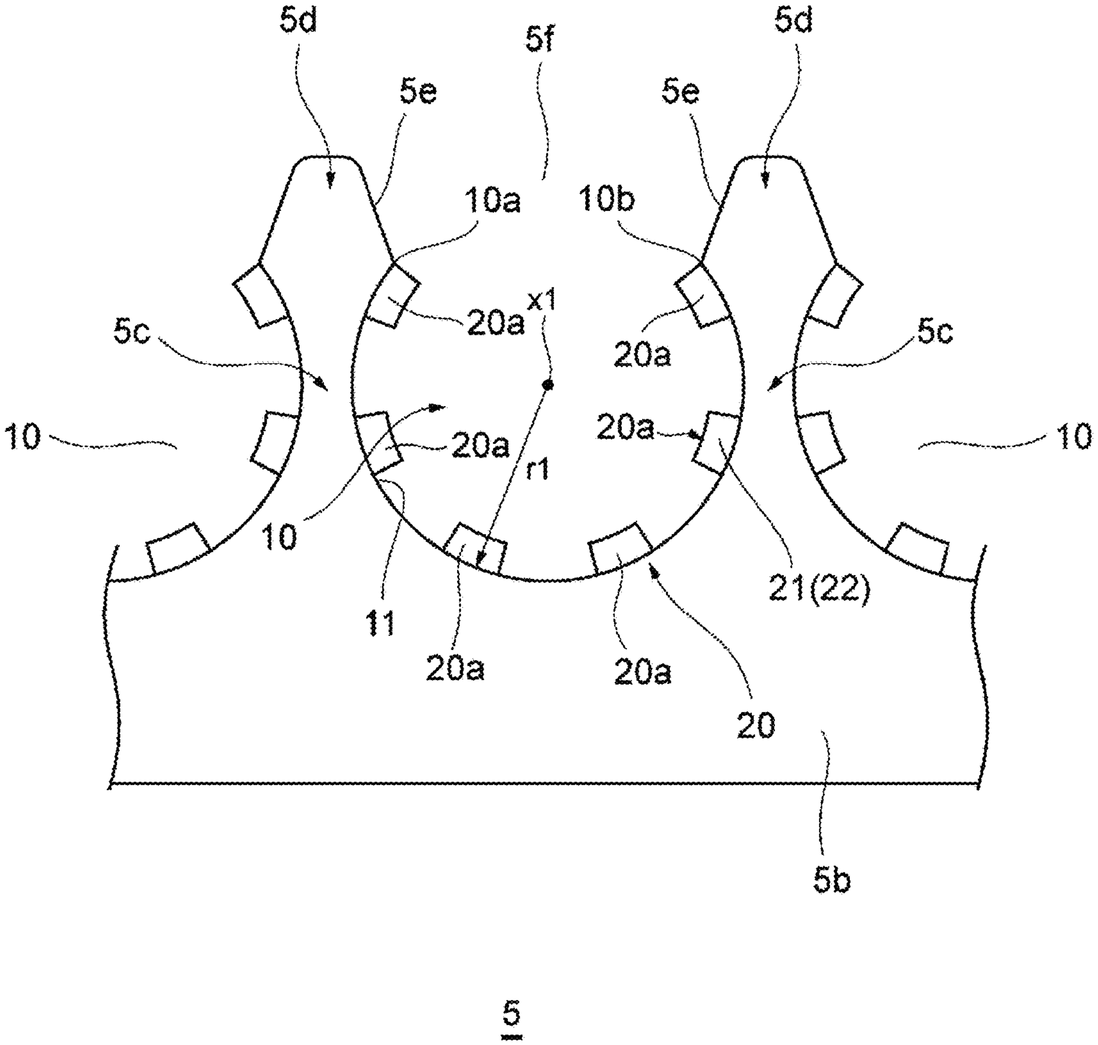
FIG. 10 is a view for illustrating another modified example of the flange part of the ball bearing according to the first embodiment of the present invention.

Next, another modified example of the flange part 20 of the ball bearing 1 according to the first embodiment of the present invention described above will be described. FIG. 10 is a view illustrating the modified example of the flange part 20 of the ball bearing 1, and illustrates the pocket 10 as viewed from the outer peripheral surface 5*b* side toward the inner peripheral surface 5*a* side in the pocket axial line x1 direction. As illustrated in FIG. 10, the flange part 20 may intermittently protrude about the pocket axial line x1 along the pocket surface 11. For example, as illustrated in FIG. 10, the flange part 20 may be formed by a plurality of flange pieces 20*a* provided separated by gaps about the pocket axial line x1. A shape of a cross section of each flange piece 20*a* including the pocket axial line x1 is the same as the shape of the cross section of the flange part 20 including the pocket axial line x1 described above (refer to FIGS. 5, 9). Further, the inclined surface 21 or the stepped surface 22 of each flange piece 20*a* coincides with the inclined surface 21 or the stepped surface 22 at the corresponding position of the flange part 20 described above (refer to FIG. 4). Note that a number of the flange pieces 20*a* is not limited to the number illustrated in the drawing.

Next, a ball bearing 6 according to a second embodiment of the present invention will be described. The ball bearing 6 according to the second embodiment of the present invention includes a cage 7 different from the cage 5 of the ball bearing 1 according to the first embodiment of the present invention described above. The cage 7 of the ball bearing 6 differs from the cage 5 described above in including pockets 13 different from the pockets 10 of the ball bearing 1. Hereinafter, for the ball bearing 6, configurations having the same configurations or similar functions as the configurations or functions of the ball bearing 1 described above are denoted by the same reference signs as the reference signs for the ball bearing 1 and descriptions are omitted. Only configurations different from the configurations of the ball bearing 1 will be described.

Figure 11:
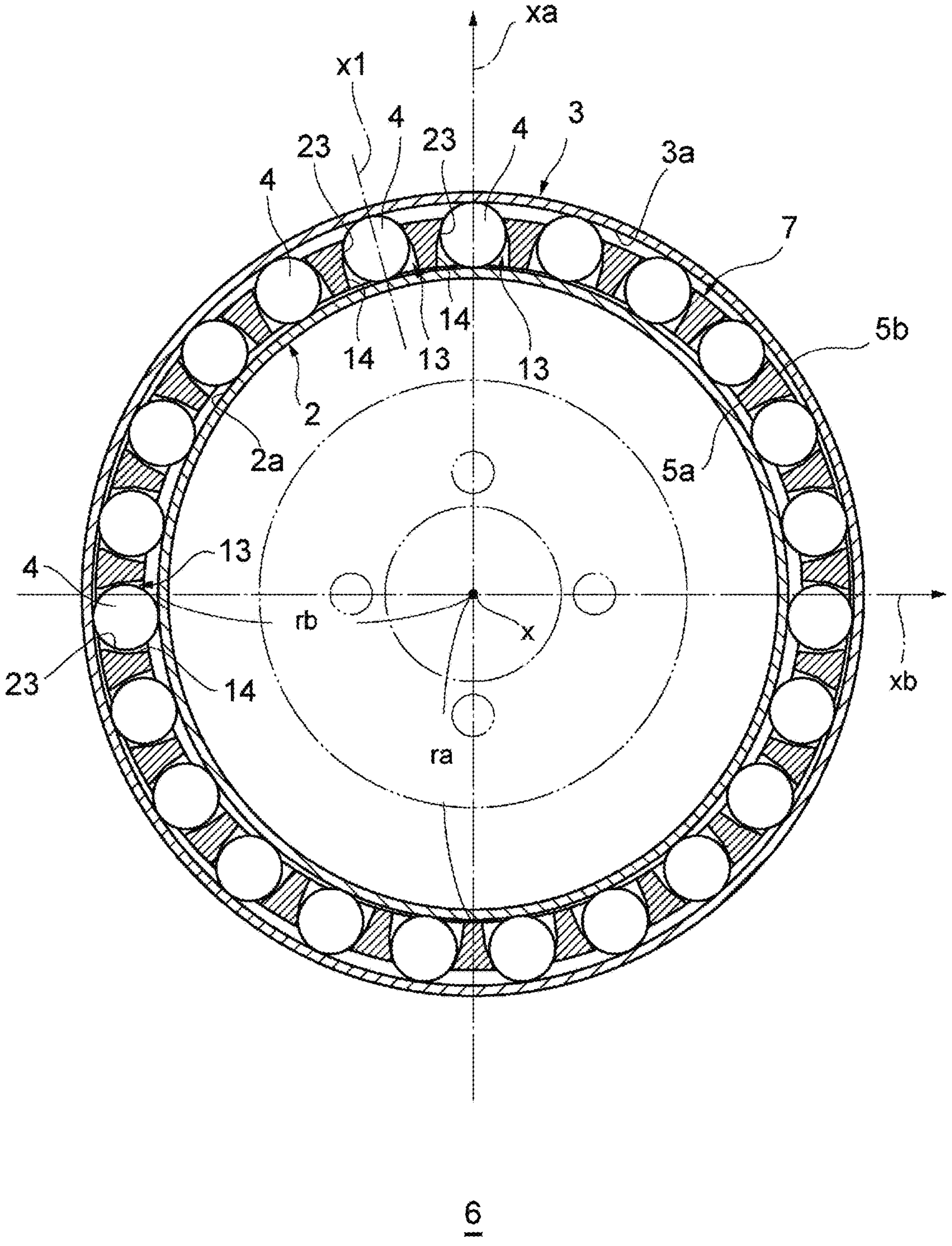
FIG. 11 is a partial cross-sectional view of a ball bearing according to a second embodiment of the present invention.
Figure 12:
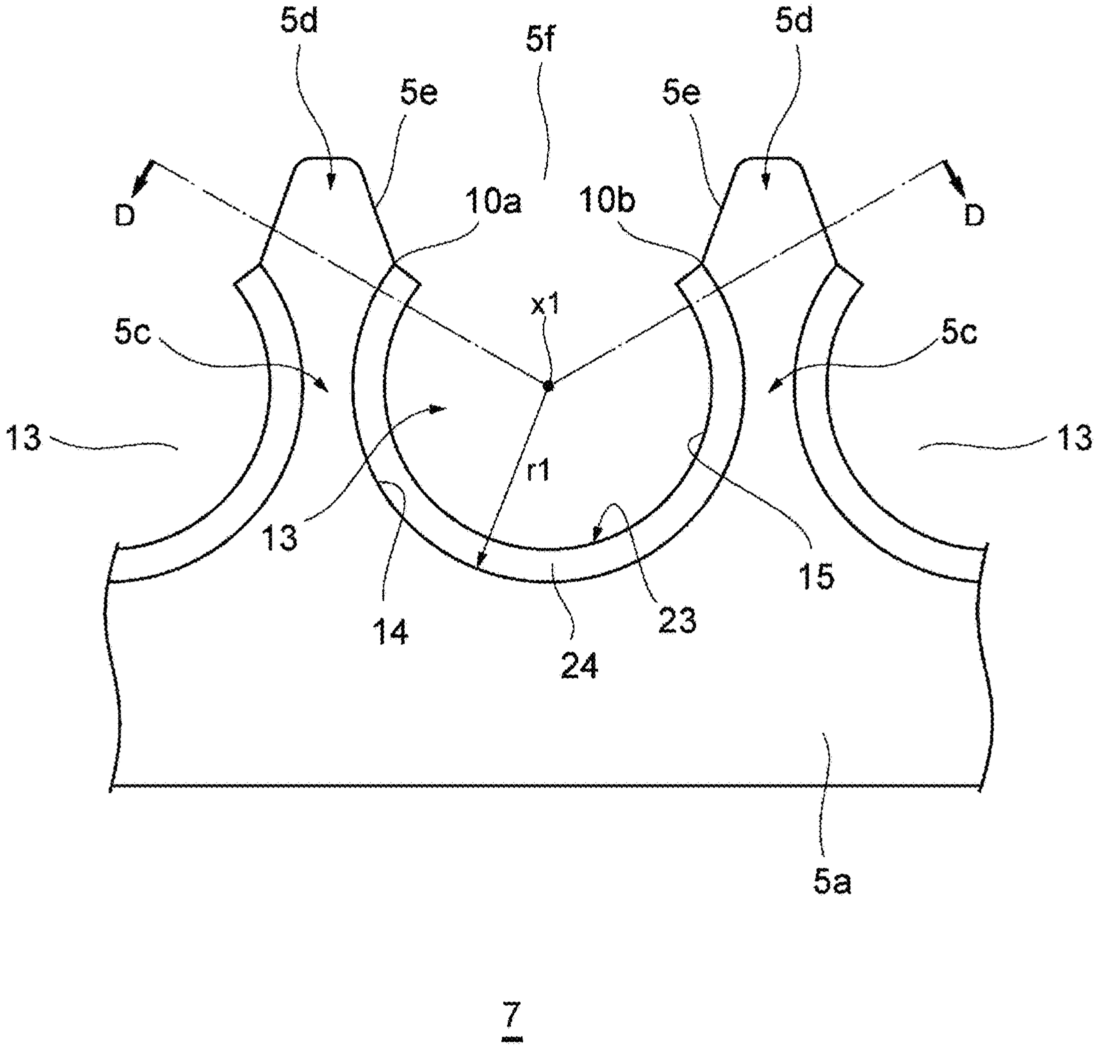
FIG. 12 is an enlarged view illustrating a pocket of a cage in the ball bearing illustrated in FIG. 11.
Figure 13:
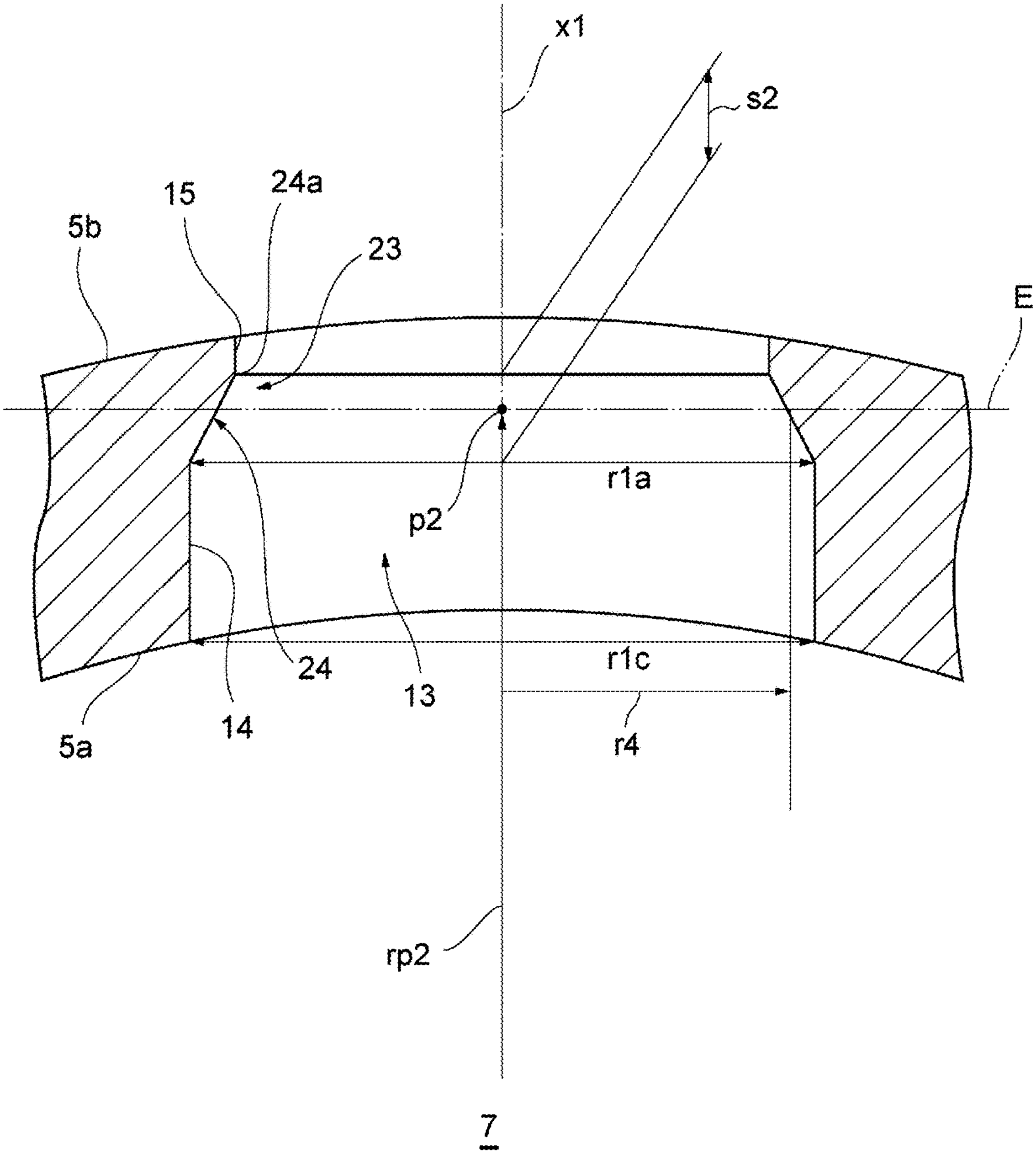
FIG. 13 is a cross-sectional view of the cage in a cross section taken along line D-D extending in the radial direction of the pocket in FIG. 12.

FIG. 11 is a partial cross-sectional view of the ball bearing 6 according to the second embodiment of the present invention. FIG. 11 illustrates the ball bearing 6 as viewed from the front with the inner ring 2, the outer ring 3, and the cage 7 cut away. Further, FIG. 12 is an enlarged view illustrating the pocket 13 of the cage 7, and FIG. 13 is a cross-sectional view of a cross section taken along line D-D extending in the pocket radial direction in FIG. 12. Note that, in FIG. 11, as in FIG. 1, the ball bearing 6 is illustrated in a form when attached to the cam 102 of the strain wave gearing 100, the cam 102 having an elliptical shape. Further, FIG. 12 illustrates the pocket 13 when the pocket 13 is viewed from the inner peripheral surface 5*a* side toward the outer peripheral surface 5*b* side in the pocket axial line x1 direction.

As illustrated in FIGS. 11 to 13, each pocket 13 of the cage 7 of the ball bearing 6 includes a flange part 23 for supporting the cage 7 as with the flange part 20 of the pocket 10 described above. Unlike the flange part 20 described above, the flange part 23 is configured to come into contact with the rolling element 4 positioned at at least the position of the major radius ra of the inner ring 2 from the outside in the radial direction. Note that, as illustrated in FIG. 11, the rolling element 4, in the ball bearings 6, positioned at the position of the major radius ra of the inner ring 2 is the rolling element 4 in contact with the outer peripheral surface 2*a* of the inner ring 2 at the position of the major radius ra and with a center positioned on the major axis xa of the inner ring 2.

In the cage 7 of the ball bearings 6, as illustrated in FIG. 11, a plurality of the pockets 13 are formed between the claw parts 5*c* adjacent to each other in the circumferential direction, similarly to the plurality of pockets 10 in the cage 5 described above. Each pocket 13 extends along the pocket axial line x1 and penetrates the cage 7 between the inner peripheral surface 5*a* and the outer peripheral surface 5*b* of the cage 7. Further, the pocket axial line x1 of each pocket 13 extends, for example, parallel or substantially parallel to the radial direction, and the plurality of pockets 13 are provided, for example, at equiangular intervals or substantially equiangular intervals about the axial line x.

As illustrated in FIGS. 11 to 13, each pocket 13 includes a pocket surface 14 similar to the pocket surface 11 of the pocket 10 described above. The radius r1 (refer to FIG. 12) of the pocket surface 14 is larger than the radius of the rolling element 4. The pocket surface 14 is, for example, part of the conical surface, the cylindrical surface, or the substantially cylindrical surface having the pocket axial line x1 as a center axis or substantially center axis. The pocket surface 14 may be part of the conical surface, the cylindrical surface, or the substantially cylindrical surface extending along a line close to the pocket axial line x1 passing through the axial line x or a point in the vicinity of the axial line x. The pocket surface 14 is allowed to accommodate the rolling element 4 with an intervening gap across the entire range in the direction of the pocket axial line x1 and, for example, as illustrated in FIG. 13, the radius r1 of the pocket surface 14 is uniform across the entire range in the direction of the pocket axial line x1 (r1*a*=r1*c*) or increases from the flange part 23 side toward the inner peripheral surface 5*a* side in the pocket axial line x1 direction (r1*c*>r1*a*). Note that the radius r1*a* is the radius r1 of the pocket surface 14 at an end at the flange part 23 side, and the radius r1*c* is the radius r1 of the pocket surface 14 at an end at the inner peripheral surface 5*a* side. As illustrated in FIG. 13, the flange part 23 of each pocket 13 is a portion protruding inward of the pocket surface 14 in the pocket radial direction and extending about the pocket axial line x1. The flange part 23, when coming into contact with the rolling element 4 positioned at the position of the major radius ra of the inner ring 2 from the outer side in the radial direction, for example, is configured not to allow the pocket 13 to relatively move with respect to the rolling element 4, whereby the cage 7 is supported by the rolling element 4.

Figure 14:
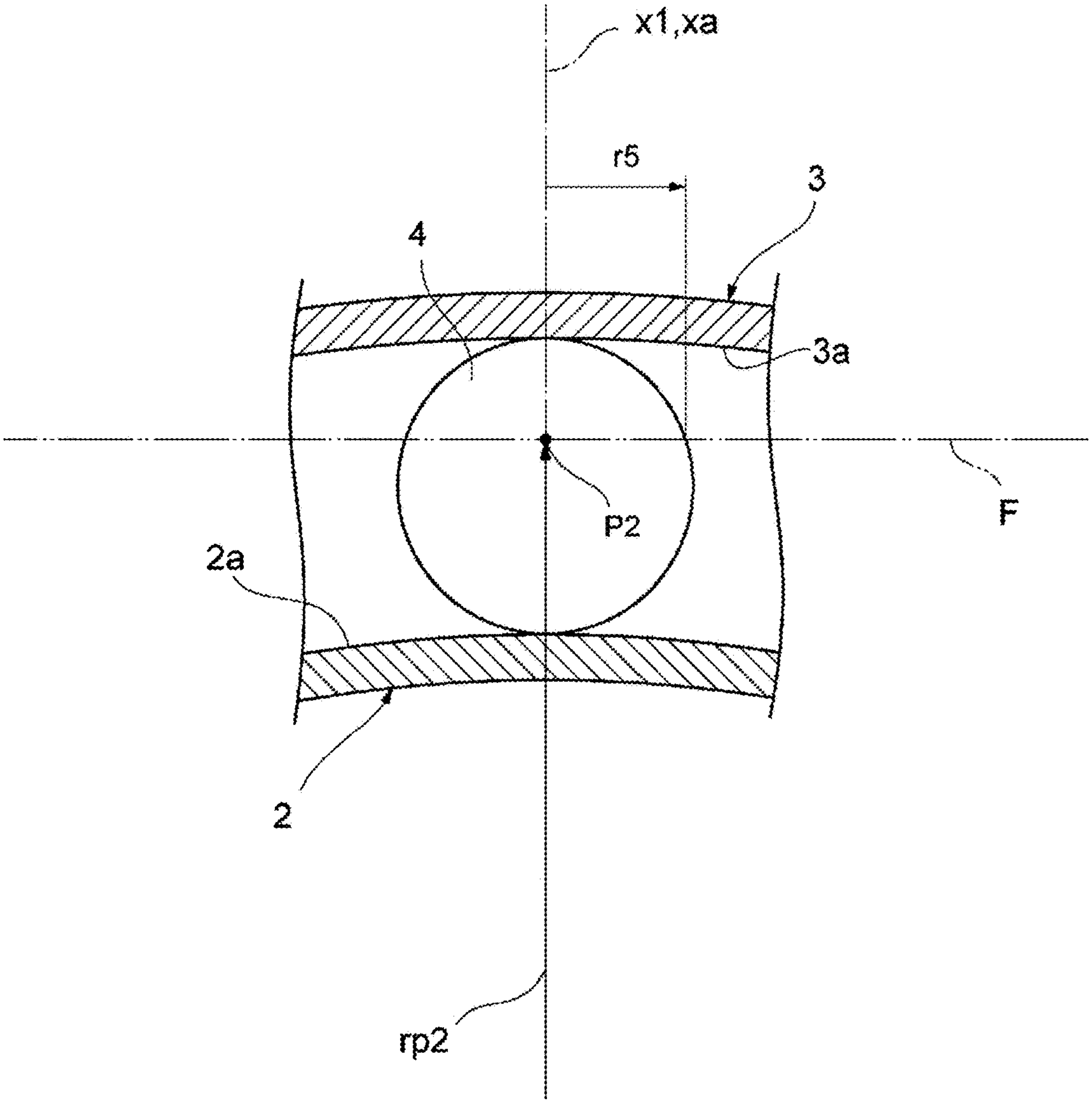
FIG. 14 is an enlarged view illustrating the vicinity of the rolling element positioned at a position of a major radius of the inner ring in the ball bearing illustrated in FIG. 11.

For example, as illustrated in FIG. 13, at a predetermined radial direction position (position p2) in the radial direction (pocket axial line x1 direction) of the ball bearing 6 within a range (range s2) of the flange part 23 on the pocket axial line x1, a radius (radius r4) of the flange part 23 in a cross section (cross section E) orthogonal to the pocket axial line x1, and a radius (radius r5) of the rolling element 4 in a cross section (cross section F) orthogonal to the major axis xa at the predetermined position p2 in the radial direction of the major axis xa of the rolling element 4 positioned at the position of the major radius ra of the inner ring 2 (refer to FIG. 14) are the same or substantially the same value. Note that FIG. 14 is an enlarged view illustrating the vicinity of the rolling element 4 positioned at the position of the major radius ra of the inner ring 2 of the ball bearing 6. In FIG. 14, the cage 7 is omitted. Further, the cross section E and the cross section F are the same cross section in the ball bearing 6.

Specifically, for example, as illustrated in FIG. 13, the flange part 23 is provided at an inner side of the pocket surface 14 in the radial direction of the ball bearing 6 and adjacent to the pocket surface 14, and is provided only at an end part of the pocket 13 at the outer side in the pocket axial line x1 direction. Further, the flange part 23, specifically, for example, as illustrated in FIG. 13, includes an inclined surface 24. The inclined surface 24 is a surface extending about the pocket axial line x1 and increasing in diameter toward the side in the direction of contact with the rolling element 4 (inner side of the ball bearing 6 in the radial direction) in the pocket axial line x1 direction. Further, the flange part 23 continuously protrudes along the pocket surface 14 about the pocket axial line x1, for example. Specifically, for example, as illustrated in FIGS. 12, 13, the flange part 23 extends between the respective opening surfaces 5*e* of the pair of claw parts 5*c* along a circular ring or substantially circular ring extending about the pocket axial line x1, and extends longer than a semicircle. Further, as illustrated in FIG. 13, a shape of a cross section orthogonal to the extending direction of the flange part 23 is uniform or substantially uniform.

Figure 15:
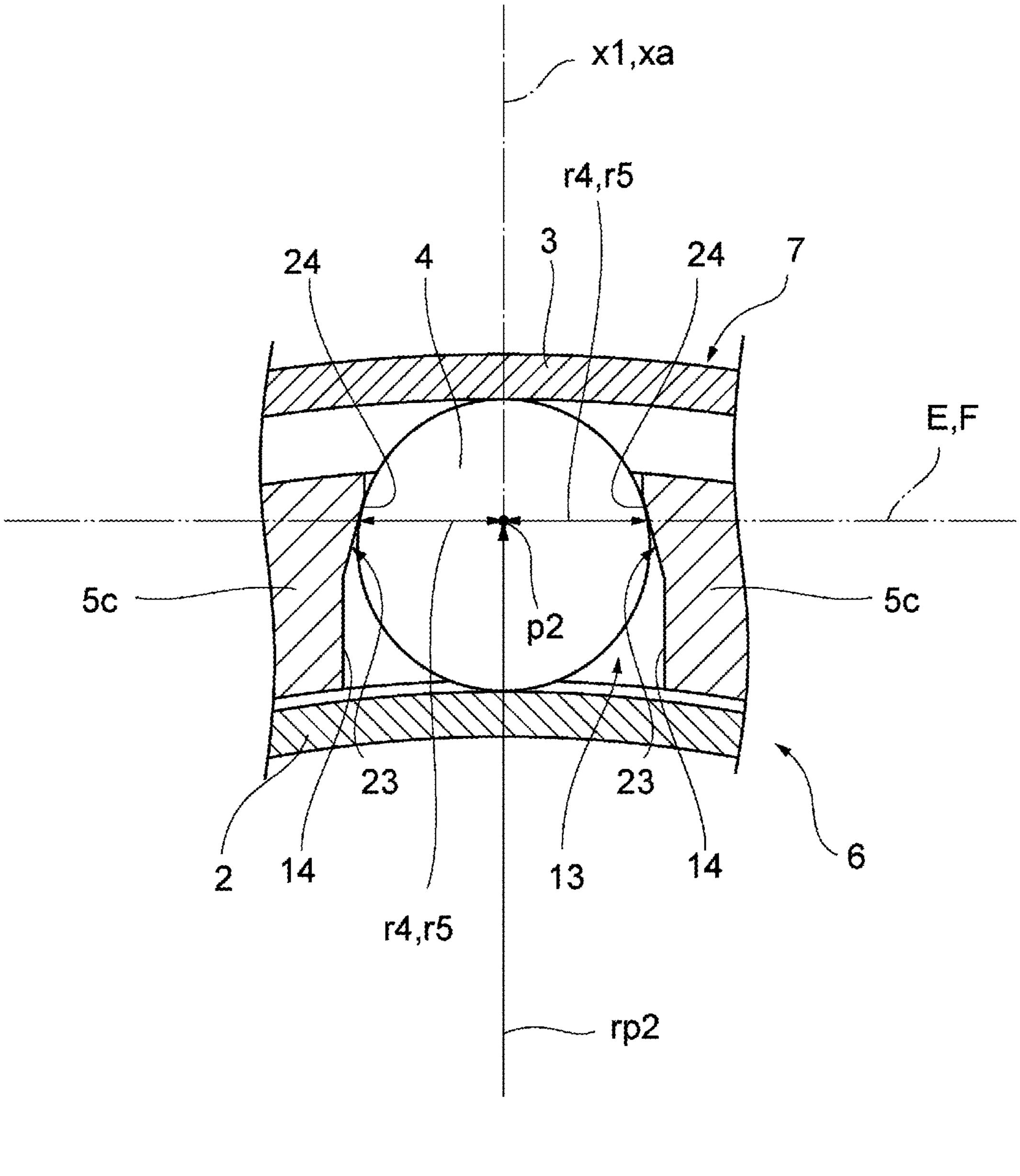
FIG. 15 is an enlarged view illustrating the vicinity of the rolling element positioned at the position of the major radius of the inner ring in the ball bearing illustrated in FIG. 11.

As described above, in the inclined surface 24, as illustrated in FIG. 13, a range projected onto the pocket axial line x1 in the pocket radial direction is the range s2, and a radius in the cross section E at the position p2 in the radial direction within the range s2 is the radius r4. Further, in the ball bearing 6, as illustrated in FIG. 14, the radius r5 in the cross section F at the position p2 in the radial direction on the major axis xa of the rolling element 4 positioned at the position of the major radius ra of the inner ring 2 has the same or substantially the same value as the radius r4 of the inclined surface 24 of the flange part 23. Therefore, as illustrated in FIG. 15 described below, a portion of the radius r4 of the inclined surface 24 of the flange part 23 comes into contact with a portion of the radius r5 of a circumferential surface of the rolling element 4 positioned at the position of the major radius ra of the inner ring 2 from the outer side of the ball bearing 6 in the radial direction. The position p2 is, for example, outward of a center of a width of the pocket 13 in the pocket axial line x1 direction. Note that, as illustrated in FIGS. 13, 14, a radius of the ball bearing 6 at a position p2 in the radial direction is rp2.

As illustrated in FIG. 13, for example, the inclined surface 24 of the flange part 23 is a tapered surface forming a straight line or substantially straight line in a cross section including the pocket axial line x1. The inclined surface 24 is not limited to such a tapered surface, and may be a surface having another shape as long as the surface comes into contact with the rolling element 4 positioned at at least the position of the major radius ra of the inner ring 2 from the outer side in the radial direction of the ball bearing 6 at the position of the radius r4 at the position p2 in the radial direction as described above. For example, in the cross section including the pocket axial line x1, the inclined surface 24 may be a surface forming a circular arc or an arc protruding toward the pocket axial line x1 side, may be a surface forming a circular arc or an arc recessed toward a side opposite to the pocket axial line x1 side, or may be a surface forming another curve. Further, the inclined surface 24 may be a surface forming a line obtained by combining a curved line and a straight line in the cross section including the pocket axial line x1.

Further, as illustrated in FIG. 13, each pocket 13 may include a relief part 15 at an outer side of the flange part 23 in the pocket axial line x1 direction. The relief part 15 extends between an end at an outer side of the inclined surface 24 of the flange part 23 in the pocket axial line x1 direction (outer end 24*a*) and the outer peripheral surface 5*b* of the cage 7, and is, for example, part of the conical surface, the cylindrical surface, or the substantially cylindrical surface having the pocket axial line x1 as a center axis or substantially center axis. The form of the relief part 15 is not limited to this form. The relief part 15, as with the pocket surface 14, may be part of the conical surface or a cylindrical surface or the substantially cylindrical surface extending along a line close to the pocket axial line x1 passing through the axial line x or a point in the vicinity of the axial line x, for example.

Figure 16:
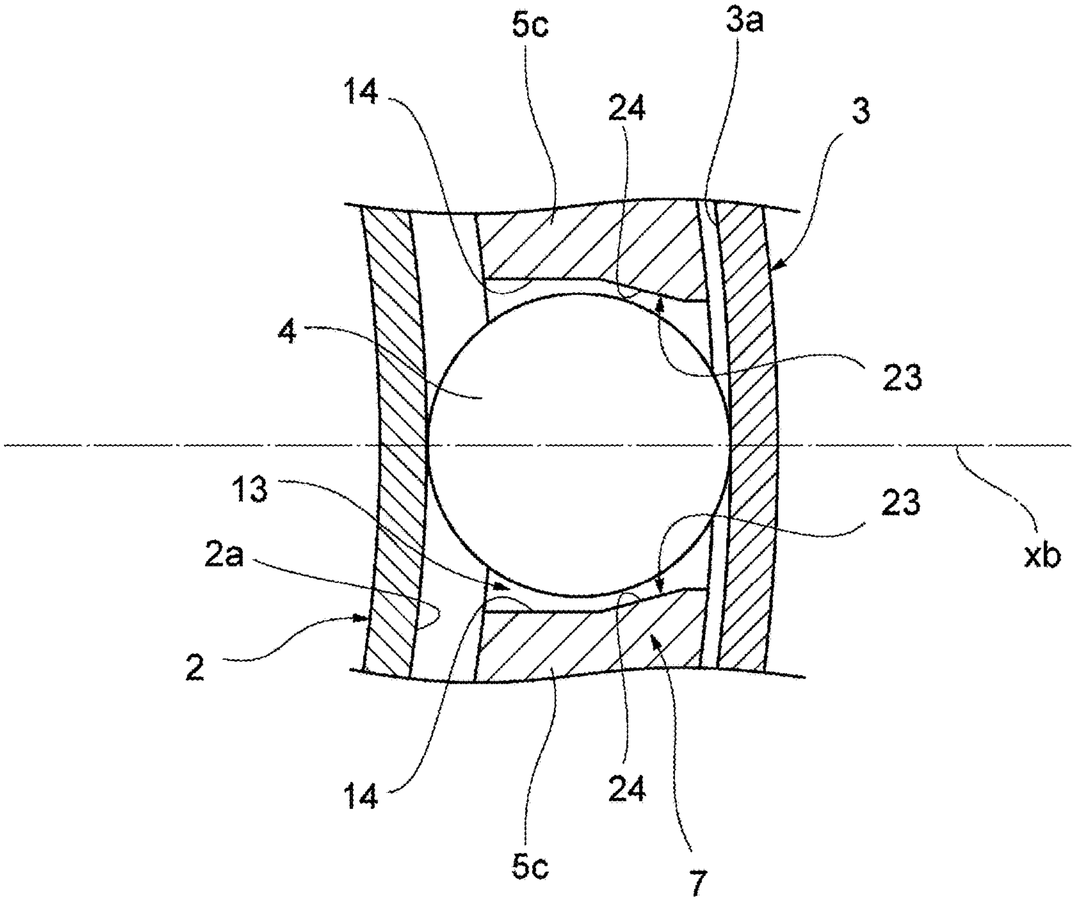
FIG. 16 is an enlarged view illustrating the vicinity of the rolling element positioned at the position of the minor radius of the inner ring in the ball bearing illustrated in FIG. 11.

Next, an action of the ball bearing 6 having the configuration described above will be described. FIG. 15 is an enlarged view illustrating the vicinity of the rolling element 4 positioned at the position of the major radius ra of the inner ring 2 in the ball bearing 6, and FIG. 16 is an enlarged view illustrating the vicinity of the rolling element 4 positioned at the position of the minor radius rb of the inner ring 2 in the ball bearing 6.

As with the rotation of the ball bearing 1 described above, in the strain wave gearing 100, when the inner ring 2 rotates about the axial line x with the rotation of the cam 102 and the cage 7 rotates about the axial line x together with the rolling elements 4, each rolling element 4 traveling on the outer peripheral surface 2*a* of the inner ring 2 relatively moves with respect to the pocket 13 in the pocket axial line x1 direction within the pocket 13 accommodating the rolling element 4. Each rolling element 4 relatively moves to an innermost side in the pocket axial line x1 direction with respect to the pocket 13 at the position of the minor radius rb of the inner ring 2, and relatively moves to an outermost side in the pocket axial line x1 direction with respect to the pocket 13 at the position of the major radius ra of the inner ring 2.

As illustrated in FIG. 15, the rolling element 4 positioned at the position of the major radius ra of the inner ring 2 and relatively moved to the outermost side in the pocket axial line x1 direction with respect to the pocket 13 comes into contact with the inclined surface 24 of the flange part 23 of the pocket 13. Specifically, a portion of the radius r4 of the inclined surface 24 on the cross section E (F) at the position p2 at the radius rp2 distance from the axial line x in the radial direction and a portion of the radius r5 of the rolling element 4 on the cross section F (E) at the position p2 at the radius rp2 distance from the axial line x in the radial direction come into contact with each other. With this contact between the flange part 23 and the rolling element 4, the cage 7 is supported by the rolling element 4 and is not allowed to relatively move with respect to the rolling element 4 in the pocket radial direction and inward of the ball bearing 6 in the radial direction.

As illustrated in FIG. 15, when the rolling element 4 is positioned at the one position of the major radius ra of the inner ring 2 on the raceway of the rolling element 4 (upper side in FIG. 11), another rolling element 4 is not positioned at the other position of the major radius ra of the inner ring 2 on the raceway of the rolling element 4 (lower side in FIG. 11). However, two of the rolling elements 4 are positioned in the vicinity of the other position of the major radius ra of the inner ring 2 on the raceway of the rolling element 4 (lower side in FIG. 11), and these two rolling elements 4 act or one of these two rolling elements 4 acts as described above in substantially the same way as the rolling element 4 positioned at the position of the major radius ra of the inner ring 2. As described above, the cage 7 is not constrained from relative movement toward the one side (upper side in FIG. 11) in the major axis xa direction by the rolling element 4 in contact at the one position (upper side in FIG. 11) on the major axis xa, but is substantially constrained from relative movement toward the one side (upper side in FIG. 11) in the major axis xa direction by at least one of the two rolling elements 4 positioned in the vicinity of the other position on the major axis xa (lower side in FIG. 11). Therefore, the cage 7 is constrained in movement in the ball bearing 6 by the contact between the one rolling element 4 positioned at the position of the major radius ra of the inner ring 2 as well as the one or two rolling elements 4 positioned in the vicinity of the position of the major radius ra of the inner ring 2 and the respective flange parts 23 of one pocket 13 positioned on the major axis xa of the inner ring 2 and one or two pockets 13 positioned in the vicinity of the major axis xa of the inner ring 2. Thus, the cage 7 is constrained in movement in the ball bearing 6 by the contact between the two or three rolling elements 4 respectively sequentially moving to the position of the major radius ra of the inner ring 2 and the vicinity of this position and the respective two or three flange parts 23 respectively sequentially moving on the major axis xa of the inner ring 2 and the vicinity of the major axis xa.

On the other hand, when the rolling element 4 positioned at the position of the major radius ra of the inner ring 2 moves from the position of the major radius ra to a position side of the minor radius rb as the inner ring 2 rotates, the contact between this moving rolling element 4 and the flange part 23 of the pocket 13 accommodating this rolling element 4 is released, and the support of the cage 7 by the rolling element 4 is released.

As described above, at the position of the minor radius rb of the inner ring 2, each rolling element 4 relatively moves to the innermost side in the pocket axial line x1 direction with respect to the pocket 13 accommodating the rolling element 4. That is, as illustrated in FIG. 16, the rolling element 4 positioned at the position of the minor radius rb of the inner ring 2 moves to a position farthest from the inclined surface 24 of the flange part 23 of the pocket 13.

Thus, in the ball bearing 6, the cage 7 is supported only by the rolling elements 4 positioned in the vicinity of the major radius ra of the inner ring 2. As a result, in the use state of the ball bearing 6, it is possible to suppress generation of a force causing deformation of the cage 7. Further, in the ball bearing 6, as illustrated in FIG. 14, the flange part 23 and the rolling element 4 come into contact at a portion of the radius r4 of the inclined surface 24 and a portion of the radius r5 of the rolling element 4 in the cross section E (F) at the same position p2 of the radius rp2. Therefore, a force causing deformation of the cage 7 is not generated by the contact between the flange part 23 and the rolling element 4. Accordingly, in the ball bearing 6, the cage 7 is not deformed in the use state.

When the position of the flange part 23 coming into contact with the rolling element 4 positioned at the position of the major radius ra of the inner ring 2 becomes the position of the radius of the inclined surface 24 in the cross section at a position inward of the position p2 of the radius rp2 in the radial direction due to manufacturing errors, assembly errors, or the like, a force causing deformation of the cage 7 at the axial line x side is generated in the cage 7 at the position of the major axis xa. When the cage 7 is deformed by this force, the cage 7 bends at the position of the minor axis xb and increases in curvature, and the gap in the circumferential direction of the pocket 13 on the minor axis xb narrows. In particular, a width in the circumferential direction of a portion of the pocket surface 14 positioned at the inner side in the radial direction narrows. On the other hand, as described above, the rolling element 4 positioned at the position of the minor radius rb of the inner ring 2 relatively moves to the innermost side in the pocket axial line x1 direction with respect to the pocket 13 accommodating the rolling element 4. Therefore, even if the cage 7 deforms by the contact between the rolling element 4 on the major axis xa and the flange part 23 as described above, the radius of the tubular part 14 of the pocket 13 may be adjusted to avoid or suppress the pressing of the pocket 13 on the minor axis xb against the rolling element 7. By this adjustment, it is possible to avoid or suppress further deformation of the cage 7 and avoid or suppress damage to the cage 7.

Further, in the use state of the ball bearing 6, the cage 7 does not come into contact with the inner ring 2 or the outer ring 3, making it possible to prevent an increase in torque resistance of the ball bearing 6. Further, in this respect as well, deformation of the cage 7 in the use state is avoided or suppressed, and damage to the cage 7 is avoided or suppressed.

As described above, the flange part 23 of the pocket 13 of the ball bearing 6 can constrain the movement of the cage 7 in the ball bearing 6, and can prevent or reduce the vibration of the cage 7 in the ball bearing 6. Further, the pocket 13 of the ball bearing 6 can suppress deformation of the cage 7.

As described above, when the rolling element 4 is positioned at the one position of the major radius ra of the inner ring 2 on the raceway of the rolling element 4, the two rolling elements 4 positioned in the vicinity of the other position of the major radius ra of the inner ring 2 on the raceway of the rolling element 4 act in substantially the same way as the rolling element 4 positioned at the position of the major radius ra of the inner ring 2. However, at least one of these two rolling elements 4 positioned in the vicinity of the other position of the major radius ra of the inner ring 2 on the raceway of the rolling element 4 may be configured to act in the same way as the rolling element 4 positioned at the position of the major radius ra of the inner ring 2. Specifically, the rolling element 4 positioned at the one position of the major radius ra of the inner ring 2 on the raceway of the rolling element 4 and at least one of the two rolling elements 4 positioned in the vicinity of the other position of the major radius ra of the inner ring 2 on the raceway of the rolling element 4 may be configured to come into contact with the flange part 23 of the pocket 13.

Thus, according to the ball bearing 6 according to the second embodiment of the present invention, in the strain wave gearing 100, it is possible to prevent vibration of the cage 7 while preventing deformation of the cage 7.

Figure 17:
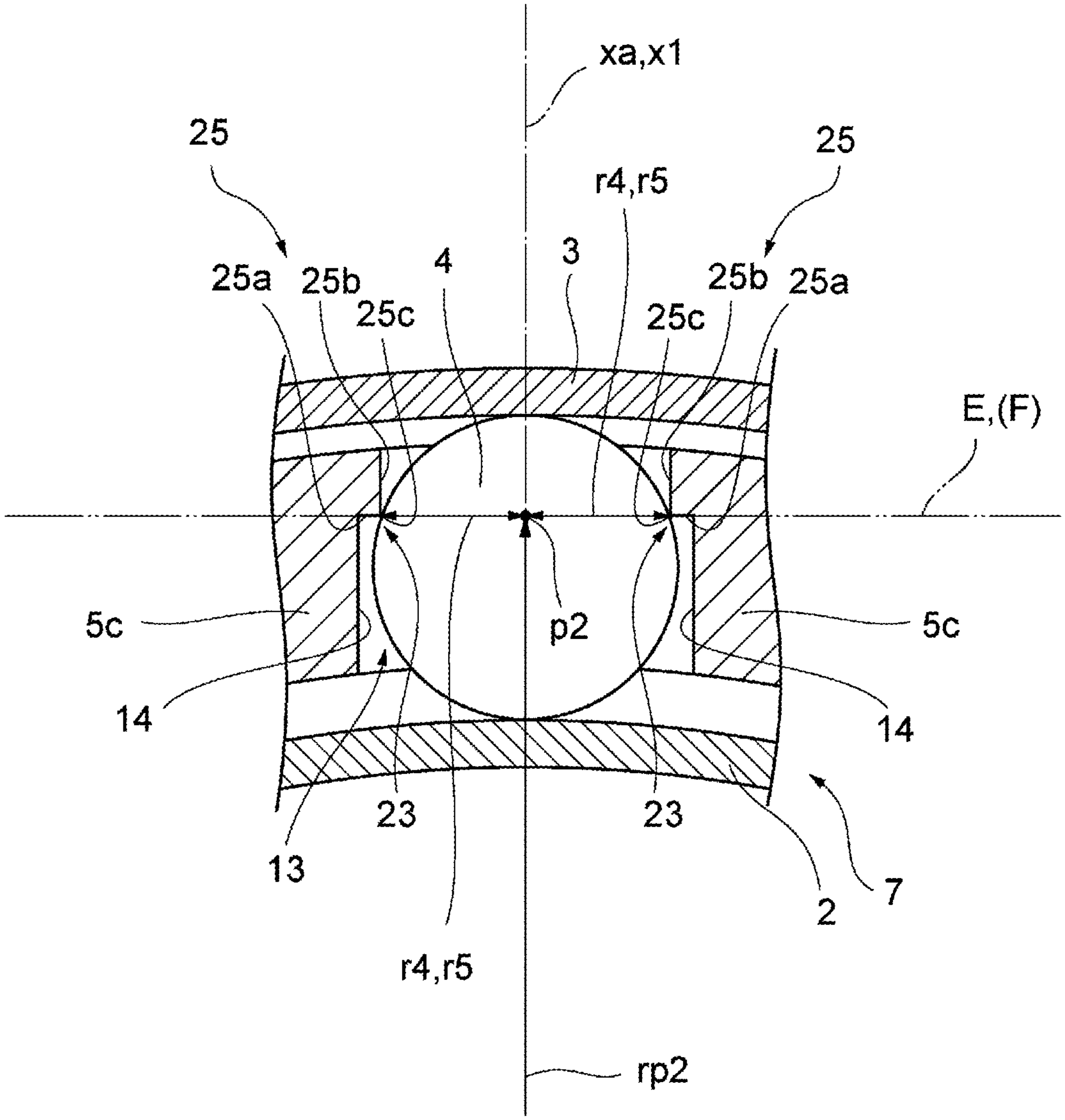
FIG. 17 is a view illustrating a modified example of the flange part of the ball bearing according to the second embodiment of the present invention.

Next, a modified example of the flange part 23 of the ball bearing 6 according to the second embodiment of the present invention described above will be described. FIG. 17 is a view illustrating the modified example of the flange part 23 of the ball bearing 6, and is an enlarged view illustrating the vicinity of the rolling element 4 positioned at the position of the major radius ra of the inner ring 2 of the ball bearing 6. As illustrated in FIG. 17, the flange part 23 of the ball bearing 6 may include a stepped surface 25 instead of the inclined surface 24 described above. The stepped surface 25 includes an annular surface 25*a* and a tubular surface 25*b*. The annular surface 25*a* is a surface having an annular shape about the pocket axial line x1 extending inward in the pocket radial direction from the end of the pocket surface 14 at the outer side in the pocket axial line x1 direction. The tubular surface 25*b* extends along the pocket axial line x1 extending from an end of the annular surface 25*a* at the inner side of the pocket radial direction to the outer peripheral surface 5*b* at the outer side in the pocket axial line x1 direction.

The annular surface 25*a* is a surface extending along a plane orthogonal to the pocket axial line x1 and, as illustrated in FIG. 17, for example, is a surface parallel or substantially parallel to the plane orthogonal to the pocket axial line x1, and is part of the annular surface or the substantially annular surface having the pocket axial line x1 as a center axis or substantially center axis. Further, the tubular surface 25*b* is part of a tubular surface extending along the pocket axial line x1, and is, for example, part of the conical surface, the cylindrical surface, or the substantially cylindrical surface having the pocket axial line x1 as a center axis or substantially center axis. The tubular surface 25*b* may be part of the conical surface, the cylindrical surface, or the substantially cylindrical surface extending along a line close to the pocket axial line x1 passing through the axial line x or a point in the vicinity of the axial line x, for example. The annular surface 25*a* and the tubular surface 25*b* extend continuously between the connection part 10*a* and the connection part 10*b* (refer to FIG. 12).

A connection part 25*c*, being a portion connecting the annular surface 25*a* and the tubular surface 25*b*, is positioned in the cross section E at the position p2 of the radius rp2 described above and extends on the circular ring centered on the pocket axial line x1. A radius of the connection part 25*c* in the pocket radial direction is the radius r4. Therefore, at the connection part 25*c*, similarly to the inclined surface 24 of the flange part 23 described above, the stepped surface 25 of the flange part 23 comes into contact with the rolling element 4 positioned at at least the position of the major radius ra of the inner ring 2, and the cage 7 is supported. Accordingly, the stepped surface 25 of the flange part 23 according to the present modified example also acts in the same manner as the inclined surface 24 of the flange part 23 described above.

Figure 18:
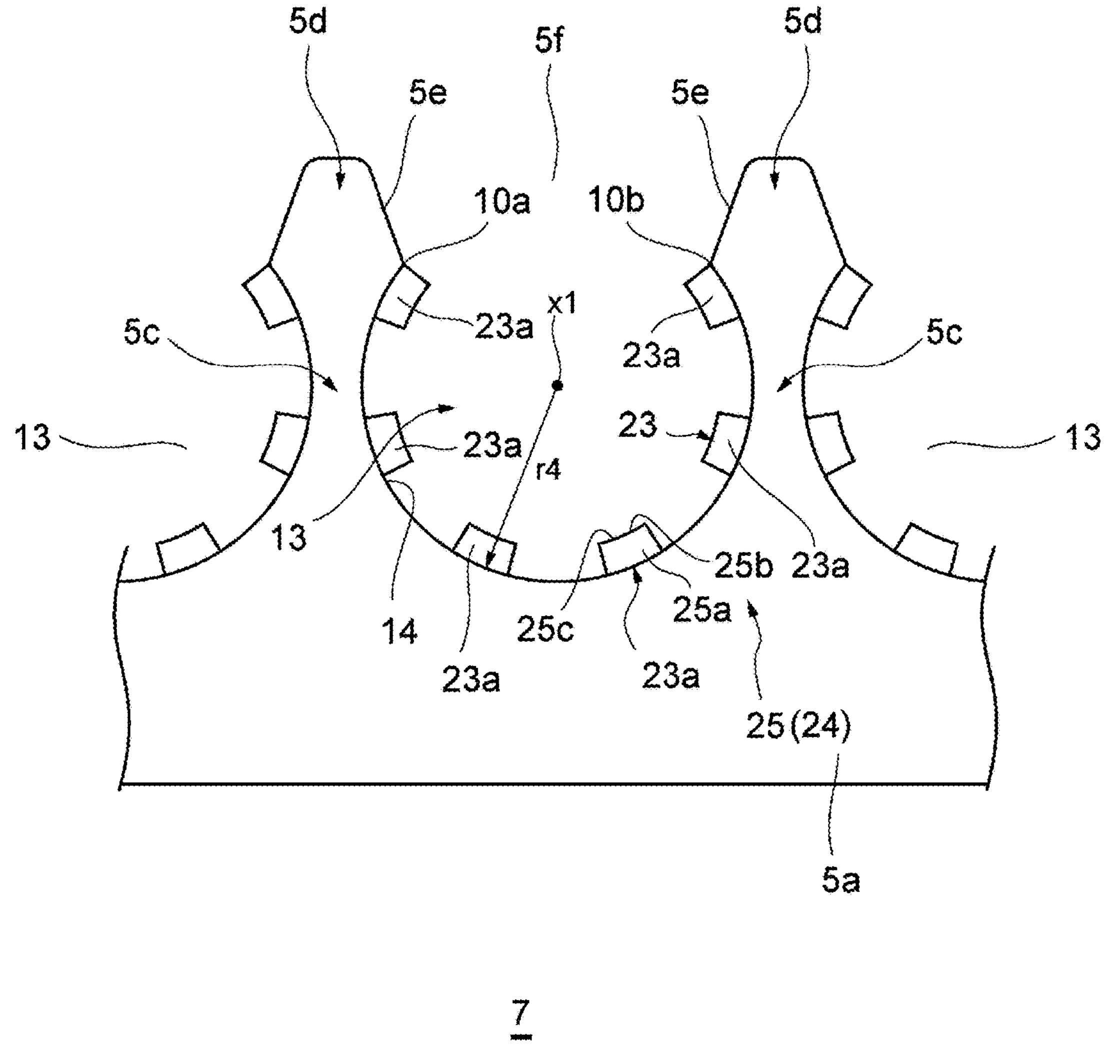
FIG. 18 is a view illustrating another modified example of the flange part of the ball bearing according to the second embodiment of the present invention.

Next, another modified example of the flange part 23 of the ball bearing 6 according to the second embodiment of the present invention described above will be described. FIG. 18 is a view illustrating the other modified example of the flange part 23 of the ball bearing 6, and illustrates the pocket 13 as viewed from the inner peripheral surface 5*a* side toward the outer peripheral surface 5*b* side in the pocket axial line x1 direction. As illustrated in FIG. 18, the flange part 23 may intermittently protrude about the pocket axial line x1 along the pocket surface 14. For example, as illustrated in FIG. 18, the flange part 23 may be formed by a plurality of flange pieces 23*a* provided separated by gaps about the pocket axial line x1. A shape of a cross section of each flange piece 23*a* including the pocket axial line x1 is the same as the shape of the cross section of the flange part 23 including the pocket axial line x1 described above (refer to FIGS. 13, 17). Further, the inclined surface 24 or the stepped surface 25 of each flange piece 23*a* coincides with the inclined surface 24 or the stepped surface 25 at the corresponding position of the flange part 23 described above (refer to FIG. 12). Note that a number of the flange pieces 23*a* is not limited to the number illustrated in the drawing.

Next, a ball bearing 1A according to a third embodiment of the present invention will be described. The ball bearing 1A according to the third embodiment of the present invention includes a cage 5A different from the cage 5 of the ball bearing 1 according to the first embodiment of the present invention described above. The cage 5A of the ball bearing 1A differs from the cage 5 described above in including pockets 16 different from the pockets 10 of the ball bearing 1. Hereinafter, for the ball bearing 1A, configurations having the same configurations or similar functions as the configurations or functions of the ball bearing 1 described above are denoted by the same reference signs as the reference signs for the ball bearing 1 and descriptions are omitted. Only configurations different from the configurations of the ball bearing 1 will be described.

As with the flange part 20 of the pocket 10 described above, the pocket 16 of the cage 5A includes a flange part 26 coming into contact with the rolling element 4 positioned at at least the position of the minor radius rb of the inner ring 2 from the inner side in the radial direction. At least at the time of contact with the rolling element 4 positioned at the position of the minor radius rb of the inner ring 2, the flange part 26 is configured not to allow the rolling element 4 to relatively move with respect to the pocket 16, whereby the cage 5A is supported by the rolling element 4. More specifically, at least at the time of contact with the rolling element 4 positioned at the position of the minor radius rb of the inner ring 2, the flange part 26, along with the pocket surface 11 of the pocket 16, is configured not to allow the pocket 16 to relatively move with respect to the rolling element 4, whereby the cage 5A is supported by the rolling element 4.

Figure 19:
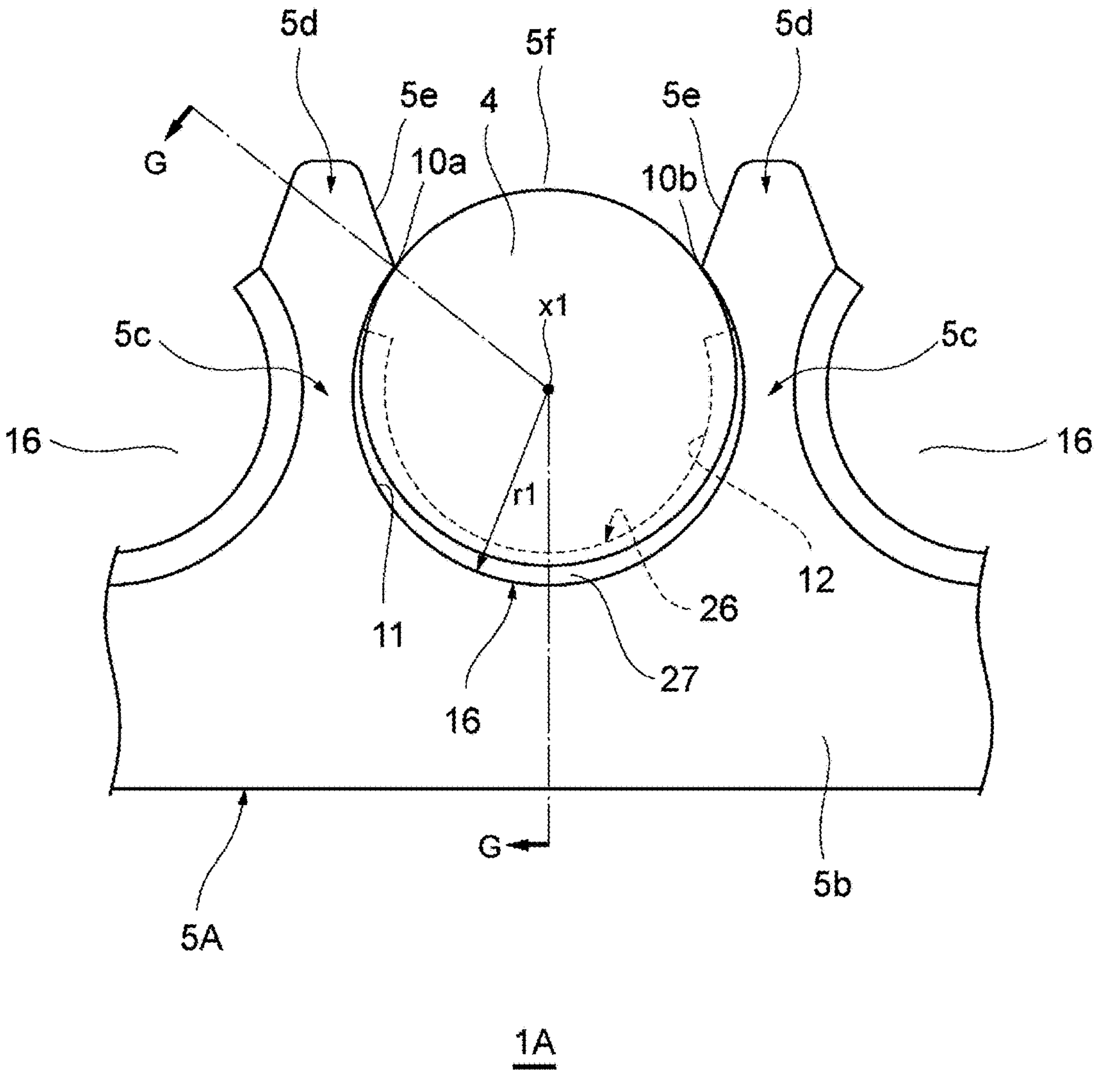
FIG. 19 is an enlarged view illustrating the vicinity of the rolling element and a pocket positioned at the position of the minor radius of the ball bearing according to a third embodiment of the present invention in the strain wave gearing.
Figure 20:
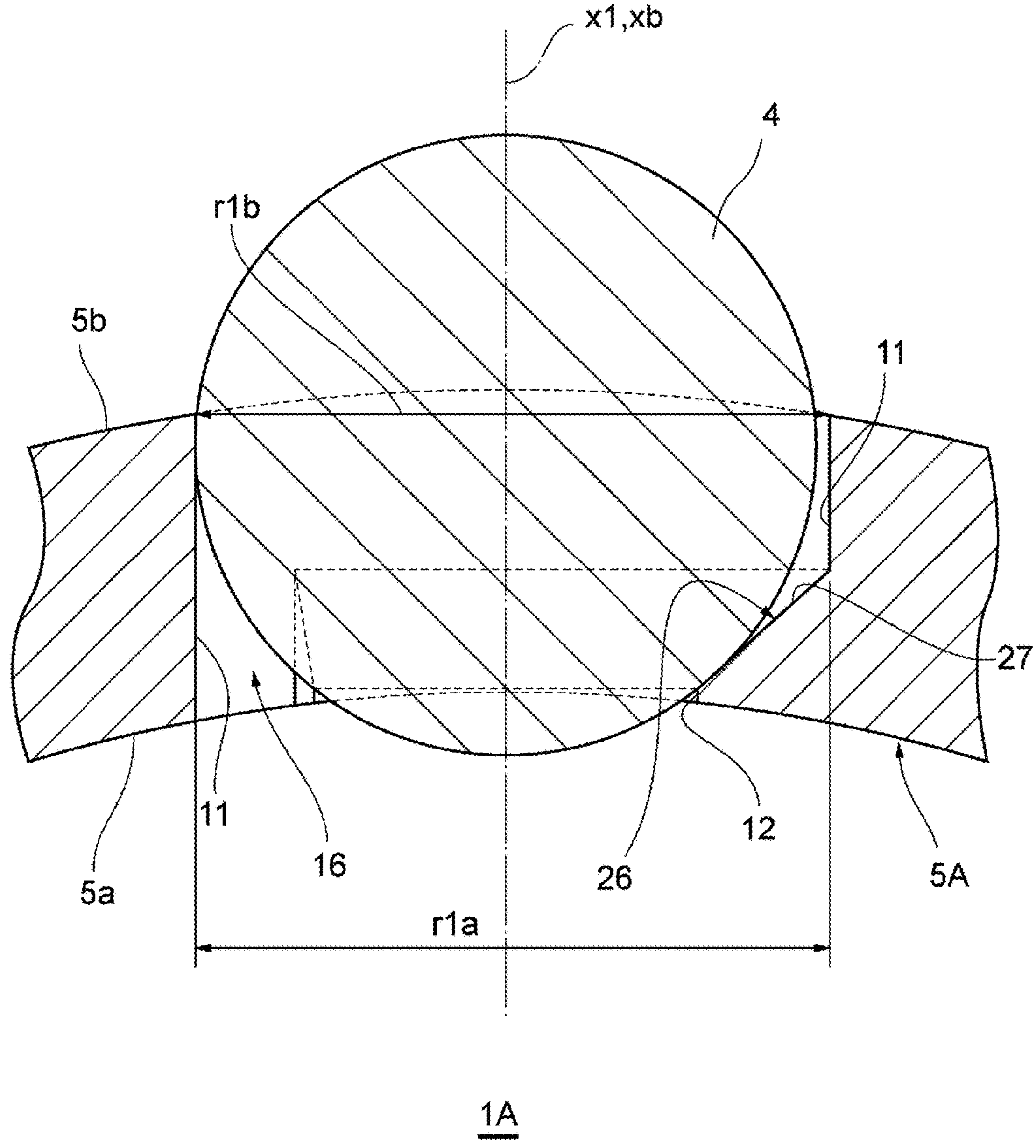
FIG. 20 is a cross-sectional view of the cage and the rolling element taken along line G-G extending in the radial direction with respect to the pocket axial line illustrated in FIG. 19.

FIG. 19 is an enlarged view illustrating the vicinity of the rolling element 4 and the pocket 16 positioned at the position of the minor radius rb of the ball bearing 1A in the strain wave gearing 100, and FIG. 20 is a cross-sectional view of a cross section taken along line G-G extending in the radial direction with respect to the pocket axial line x1 in FIG. 19. Note that FIG. 19 illustrates the rolling element 4 and the pocket 16 when viewed from the outer peripheral surface 5*b* side toward the inner peripheral surface 5*a* side in the pocket axial line x1 direction.

As illustrated in FIG. 19, 20, similarly to the flange part 20 in the first embodiment of the present invention described above, the flange part 26 protrudes inward in the pocket radial direction from the pocket surface 11, is adjacent to the tubular part 11 at the inner side in the pocket axial line x1 direction, and is provided only at an end part of the pocket 16 at the inner side in the pocket axial line x1 direction. Further, the flange part 26 continuously extends along the pocket surface 11 about the pocket axial line x1, similarly to the flange part 20 described above. However, as illustrated in FIG. 19, the flange part 26 does not extend to the connection part 10*a* and the connection part 10*b*. Further, the flange part 26, similarly to the flange part 20, includes an inclined surface 27. The inclined surface 27, similarly to the inclined surface 21, has such a shape as to come into contact with the rolling element 4 positioned at at least the position of the minor radius rb of the inner ring 2 from the inner side in the radial direction, but unlike the inclined surface 21, has such a shape so as to bring the rolling element 4 into contact with the pocket surface 11 at the time of this contact with the rolling element 4. Note that the inclined surface 27 may be configured to come into full contact with or may be configured to come into partial contact with the rolling element 4 positioned at at least the position of the minor radius rb of the inner ring 2. Further, the pocket surface 11 comes into partial contact with the rolling element 4 positioned at at least the position of the minor radius rb of the inner ring 2.

In the ball bearing 1A of the strain wave gearing 100, the rolling element 4 positioned at the one position of the minor radius rb of the inner ring 2 on the raceway of the rolling element 4 comes into contact with the inclined surface 27 of the flange part 26 and the pocket surface 11 at the pocket 16 accommodating this rolling element 4. Further, at least one of the two rolling elements 4 in the vicinity of the other position of the minor radius rb of the inner ring 2 on the raceway of the rolling element 4 comes into contact with the inclined surface 27 of the flange part 26 and the pocket surface 11 in substantially the same manner as the rolling element 4 positioned at the one position of the minor radius rb of the inner ring 2. Therefore, as in the case of the ball bearing 1 described above, the rolling elements 4 positioned in the vicinity of the position of the minor radius rb are substantially not allowed to relatively move with respect to the pockets 16, and the cage 5A is supported by the rolling elements 4 and is not allowed to relatively move with respect to the rolling elements 4 in the pocket radial direction and outward of the ball bearings 1A in the radial direction. Therefore, the cage 5A is constrained in movement in the ball bearing 1 by the contact between the rolling element 4 positioned at the one position of the minor radius rb of the inner ring 2 as well as at least one of the two rolling elements 4 positioned in the vicinity of the position of the minor radius rb of the inner ring 2 and the flange parts 26 and the pocket surfaces 11 of one pocket 16 positioned on the minor axis xb of the inner ring 2 and one or two pockets 16 positioned in the vicinity of the minor axis xb of the inner ring 2. Thus, the cage 5A is constrained in movement in the ball bearing 1A by the contact between the two or three rolling elements 4 respectively sequentially moving to the position of the minor radius rb of the inner ring 2 and the vicinity of the minor radius rb in the inner ring 2 and the respective flange parts 26 and pocket surfaces 11 of the two or three pockets 16 respectively sequentially moving on the minor axis xb of the inner ring 2 and in the vicinity of the minor axis xb of the inner ring 2.

On the other hand, when the rolling element 4 positioned at the position of the minor radius rb of the inner ring 2 moves from the position of the minor radius rb to a position side of the major radius ra as the inner ring 2 rotates, the contact between this moving rolling element 4 and the flange part 26 and the pocket surface 11 of the pocket 16 accommodating this rolling element is released, and the support of the cage 5A by the rolling element 4 is released.

As described above, the flange part 26 and the pocket surface 11 of the ball bearing 1A act in the same manner as the flange part 20 of the ball bearing 1, and the ball bearing 1A has the same actions and effects as the actions and effects of the ball bearing 1. Specifically, the flange part 26 and the pocket surface 11 of the pocket 16 can constrain the movement of the cage 1A in the ball bearing 1A of the cage 5A, and can prevent or reduce the vibration of the cage 5A in the ball bearing 1A. Further, the pocket 16 of the ball bearing 1A can suppress the deformation of the cage 5A.

As described above, when the rolling element 4 is positioned at the one position of the minor radius rb of the inner ring 2 on the raceway of the rolling element 4, the two rolling elements 4 positioned in the vicinity of the other position of the minor radius rb of the inner ring 2 on the raceway of the rolling element 4 act in substantially the same way as the rolling element 4 positioned at the position of the minor radius rb of the inner ring 2. However, at least one of these two rolling elements 4 positioned in the vicinity of the other position of the minor radius rb of the inner ring 2 on the raceway of the rolling element 4 may be configured to act in the same way as the rolling element 4 positioned at the position of the minor radius rb of the inner ring 2. Specifically, the rolling element 4 positioned at the one position of the minor radius rb of the inner ring 2 on the raceway of the rolling element 4 and at least one of the two rolling elements 4 positioned in the vicinity of the other position of the minor radius rb of the inner ring 2 on the raceway of the rolling element 4 may be configured to come into contact with the flange part 26 and the pocket surface 11 of the pocket 16.

Thus, according to the ball bearing 1A according to the third embodiment of the present invention, in the strain wave gearing 100, it is possible to prevent vibration of the cage 5A while preventing deformation of the cage 5A.

Note that the flange part 26 can be deformed in the same manner as the flange part 20 of the ball bearing 1 according to the first embodiment of the present invention described above. That is, as illustrated in FIG. 9, the flange part 26 may include a stepped surface similar to the stepped surface 22 instead of the inclined surface 27. Further, as illustrated in FIG. 10, the flange part 26 may intermittently protrude about the pocket axial line x1 along the pocket surface 11.

Next, a ball bearing 6A according to a fourth embodiment of the present invention will be described. The ball bearing 6A according to the fourth embodiment of the present invention includes a cage 7A different from the cage 7 of the ball bearing 6 according to the second embodiment of the present invention described above. The cage 7A of the ball bearing 6A differs from the cage 7 described above in including pockets 17 different from the pockets 13 of the ball bearing 6. Hereinafter, for the ball bearing 6A, configurations having the same configurations or similar functions as the configurations or functions of the ball bearing 6 described above are denoted by the same reference signs as the reference signs for the ball bearing 6 and descriptions are omitted. Only configurations different from the configurations of the ball bearing 6 will be described.

As with the flange part 23 of the pocket 13 described above, the pocket 17 of the cage 7A includes a flange part 28 coming into contact with the rolling element 4 positioned at at least the position of the major radius ra of the inner ring 2 from the outer side in the radial direction. At least at the time of contact with the rolling element 4 positioned at the position of the major radius ra of the inner ring 2, the flange part 28 is configured not to allow the rolling element 4 to relatively move with respect to the pocket 17, whereby the cage 7A is supported by the rolling element 4. More specifically, at least at the time of contact with the rolling element 4 positioned at the position of the major radius ra of the inner ring 2, the flange part 28, along with the pocket surface 14 of the pocket 17, is configured not to allow the pocket 17 to relatively move with respect to the rolling element 4, whereby the cage 7A is supported by the rolling element 4.

Figure 21:
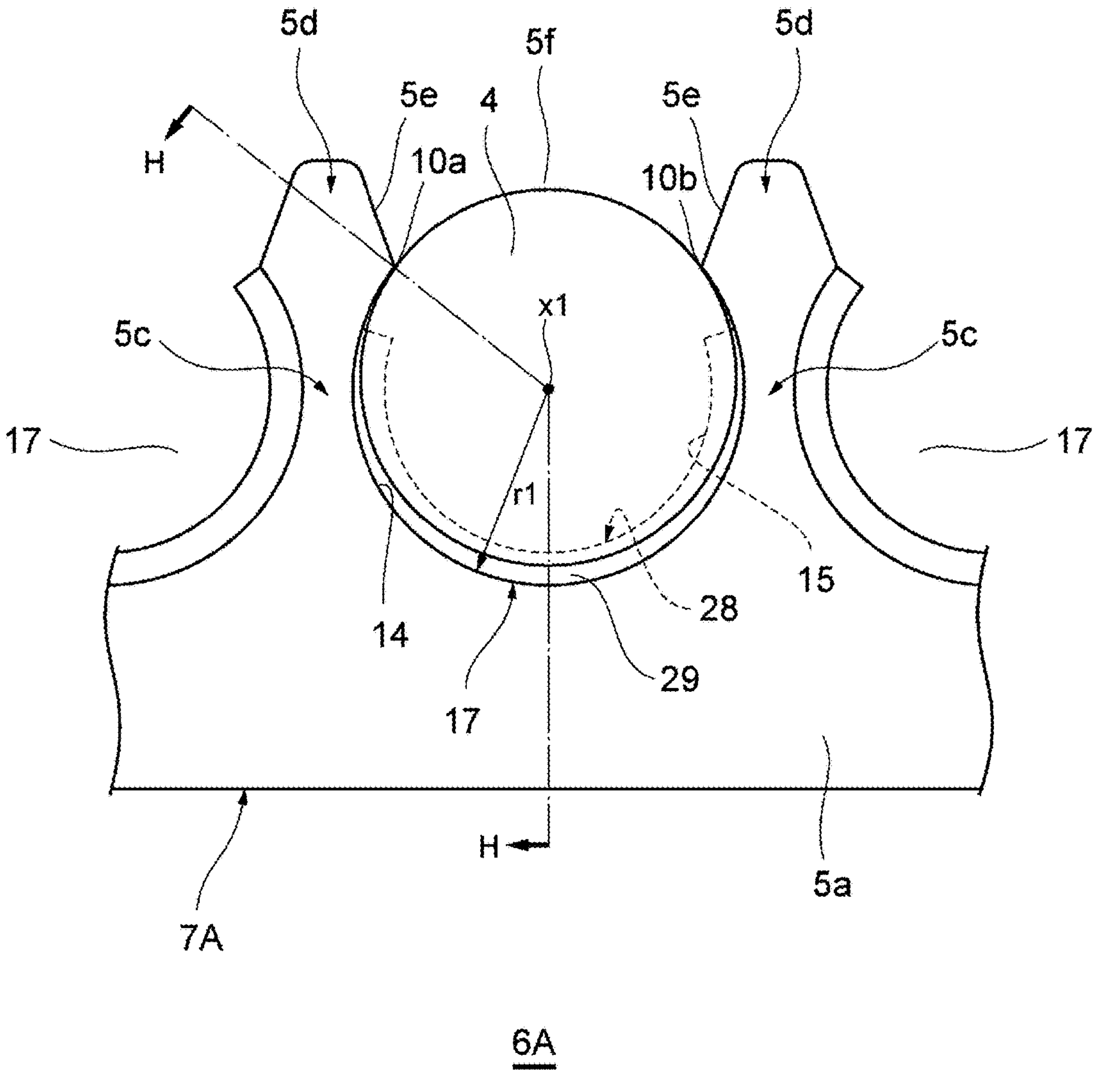
FIG. 21 is an enlarged view illustrating the vicinity of the rolling element and a pocket positioned at the position of the major radius of the ball bearing according to a fourth embodiment of the present invention in the strain wave gearing.
Figure 22:
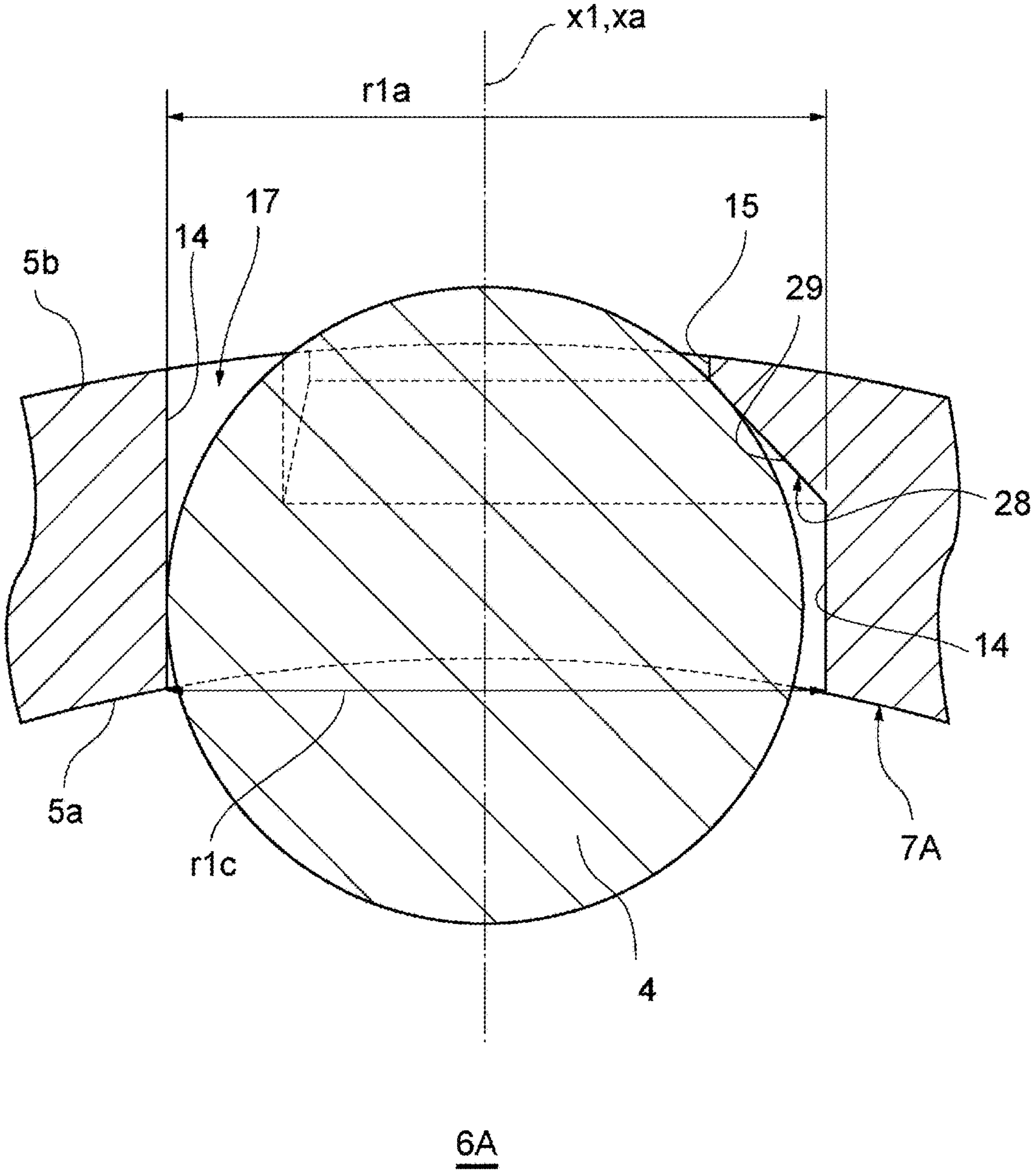
FIG. 22 is a cross-sectional view of the cage and the rolling element taken along line H-H extending in the radial direction with respect to the pocket axial line illustrated in FIG. 21.

FIG. 21 is an enlarged view illustrating the vicinity of the rolling element 4 and the pocket 17 positioned at the position of the major radius ra of the ball bearing 6A in the strain wave gearing 100, and FIG. 22 is a cross-sectional view of a cross section taken along line H-H extending in the radial direction with respect to the pocket axial line x1 in FIG. 21. Note that FIG. 21 illustrates the rolling element 4 and the pocket 17 when viewed from the inner peripheral surface 5*a* side toward the outer peripheral surface 5*b* side in the pocket axial line x1 direction.

As illustrated in FIGS. 21, 22, similarly to the flange part 23 in the second embodiment of the present invention described above, the flange part 28 protrudes inward in the pocket radial direction from the pocket surface 14, is adjacent to the tubular part 14 at the outer side in the pocket axial line x1 direction, and is provided only at an end part of the pocket 17 at the outer side in the pocket axial line x1 direction. Further, the flange part 28 continuously extends along the pocket surface 14 about the pocket axial line x1, similarly to the flange part 23 described above. However, as illustrated in FIG. 21, the flange part 28 does not extend to the connection part 10*a* and the connection part 10*b*. Further, the flange part 27, similarly to the flange part 23, includes an inclined surface 29. The inclined surface 29, similarly to the inclined surface 24, has such a shape as to come into contact with the rolling element 4 positioned at at least the position of the major radius ra of the inner ring 2 from the outer side in the radial direction, but unlike the inclined surface 24, has such a shape so as to bring the rolling element 4 into contact with the pocket surface 14 when in contact with this rolling element 4. Note that the inclined surface 29 may be configured to come into full contact with or may be configured to come into partial contact with the rolling element 4 positioned at at least the position of the major radius ra of the inner ring 2. Further, the pocket surface 14 comes into partial contact with the rolling element 4 positioned at at least the position of the major radius ra of the inner ring 2.

In the ball bearing 6A of the strain wave gearing 100, the rolling element 4 positioned at the one position of the major radius ra of the inner ring 2 on the raceway of the rolling element 4 comes into contact with the inclined surface 29 of the flange part 28 and the pocket surface 14 in the pocket 17 accommodating this rolling element 4. Further, at least one of the two rolling elements 4 in the vicinity of the other position of the major radius ra of the inner ring 2 on the raceway of the rolling element 4 comes into contact with the inclined surface 29 of the flange part 28 and the pocket surface 14 in substantially the same manner as the rolling element 4 positioned at the one position of the major radius ra of the inner ring 2. Therefore, as in the case of the ball bearing 6 described above, the rolling elements 4 positioned in the vicinity of the position of the major radius ra are substantially not allowed to relatively move with respect to the pockets 17, and the cage 7A is supported by the rolling elements 4 and is not allowed to relatively move with respect to the rolling elements 4 in the pocket radial direction and inward of the ball bearings 6A in the radial direction. Therefore, the cage 7A is constrained in movement in the ball bearing 6A by the contact between the one rolling element 4 positioned at the position of the major radius ra of the inner ring 2 as well as at least one of the two rolling elements 4 positioned in the vicinity of the position of the major radius ra of the inner ring 2 and the flange parts 28 and the pocket surfaces 14 of one pocket 17 positioned on the major axis xa of the inner ring 2 and one or two pockets 17 positioned in the vicinity of the major axis xa of the inner ring 2. Thus, the movement of the cage 7A in the ball bearing 6A is constrained by the contact between two or three of the rolling elements 4 respectively sequentially moving to the position of the major radius ra of the inner ring 2 and the vicinity of the major radius ra of the inner ring 2 and the respective flange parts 28 and pocket surfaces 14 of the two or three pockets 17 respectively sequentially moving on the major axis xa of the inner ring 2 and in the vicinity of the major axis xa of the inner ring 2.

On the other hand, when the rolling element 4 positioned at the position of the major radius ra of the inner ring 2 moves from the position of the major radius ra to a position side of the minor radius rb as the inner ring 2 rotates, the contact between this moving rolling element 4 and the flange part 28 and the pocket surface 14 of the pocket 17 accommodating this rolling element 4 is released, and the support of the cage 7A by the rolling element 4 is released.

As described above, the flange part 28 and the pocket surface 14 of the ball bearing 6A act in the same manner as the flange part 26 of the ball bearing 6, and the ball bearing 6A has the same actions and effects as the actions and effects of the ball bearing 6. Specifically, the flange part 28 and the pocket surface 14 of the pocket 17 can constrain the movement of the cage 7A in the ball bearing 6A, and can prevent or reduce the vibration of the cage 7A in the ball bearing 6A. Further, the pocket 17 of the ball bearing 6A can suppress deformation of the cage 7A.

As described above, when the rolling element 4 is positioned at the one position of the major radius ra of the inner ring 2 on the raceway of the rolling element 4, the two rolling elements 4 positioned in the vicinity of the other position of the major radius ra of the inner ring 2 on the raceway of the rolling element 4 act in substantially the same way as the rolling element 4 positioned at the position of the major radius ra of the inner ring 2. However, at least one of these two rolling elements 4 positioned in the vicinity of the other position of the major radius ra of the inner ring 2 on the raceway of the rolling element 4 may be configured to act in the same way as the rolling element 4 positioned at the position of the major radius ra of the inner ring 2. Specifically, the rolling element 4 positioned at the one position of the major radius ra of the inner ring 2 on the raceway of the rolling element 4 and at least one of the two rolling elements 4 positioned in the vicinity of the other position of the major radius ra of the inner ring 2 on the raceway of the rolling element 4 may be configured to come into contact with the flange part 28 and the pocket surface 14 of the pocket 17.

Thus, according to the ball bearing 6A according to the fourth embodiment of the present invention, in the strain wave gearing 100, it is possible to prevent vibration of the cage 7A while preventing deformation of the cage 7A.

Note that the flange part 27 can be deformed in the same manner as the flange part 23 of the ball bearing 6 according to the second embodiment of the present invention described above. That is, as illustrated in FIG. 17, the flange part 28 may include a stepped surface similar to the stepped surface 25 instead of the inclined surface 29. Further, as illustrated in FIG. 18, the flange part 28 may intermittently protrude about the pocket axial line x1 along the pocket surface 14.

While embodiments of the present invention have been described above, the present invention is not limited to the ball bearings 1, 1A, 6, 6A according to the embodiments of the present invention described above, and includes various aspects included in concepts and claims of the present invention. Further, the configurations may be selectively combined as appropriate so as to achieve at least part of the problems and the effects described above. For example, a shape, a material, an arrangement, a size, and the like of each of the configurations in the embodiments described above may be changed as appropriate according to a specific usage aspect of the present invention.

REFERENCE SIGNS LIST

1, 1A, 6, 6A Ball bearing, 2 Inner ring, 2*a* Outer peripheral surface, 3 Outer ring, 3*a* Inner peripheral surface, 4 Rolling element, 5, 5A, 7, 7A Cage, 5*a* Inner peripheral surface, 5*b* Outer peripheral surface, 5*c* Claw part, 5*d* Tip end part, 5*e* Opening surface, 5*f* Opening part, 10, 13, 16, 17 Pocket, 10*a*, 10*b* Connection part, 11, 14 Pocket surface, 12, 15 Relief part, 20, 23, 26, 28 Flange part, 21, 24, 27, 29 Inclined surface, 21*a* Inner end, 22, 25 Stepped surface, 22*a*, 25*a* Annular surface, 22*b*, 25*b* Tubular surface, 22*c*, 25*c* Connection part, 20*a*, 23*a* Flange piece, 24*a* Outer end, 100 Strain wave gearing, 101 Wave generator, 102 Cam, 103 Flex spline, 103*a* Teeth, 104 Circular spline, 104*a* Teeth, A, B, C, E, F Cross section, p1, p2 Position, r1, r1*a*, r1*b*, r1*c*, r2, r3, r4, r5, rp1, rp2 Radius, ra Major radius, rb Minor radius, s1, s2 Range, x Axial line, x1 Pocket axial line, xa Major axis, xb Minor axis

The invention claimed is:

1. A ball bearing comprising:
an inner ring being deformable;
an outer ring being deformable and installed outside the inner ring;
a plurality of rolling elements having a spherical shape and provided between the inner ring and the outer ring; and
a cage provided with a plurality of pockets respectively accommodating the plurality of rolling elements, wherein the rolling elements and the pockets separated by gaps in a circumferential direction, wherein
each of the plurality of pockets includes
a pocket surface being a surface spread about an axial line extending in a radial direction, and
a flange part being a portion protruding from the pocket surface toward the axial line side,
the pocket surface is configured to accommodate a rolling element with a gap interposed between the pocket surface and the rolling element,
the flange part is configured to come into contact with the rolling element positioned at at least a position of a minor radius of the inner ring from an inner side in the radial direction, or come into contact with the rolling element positioned at at least a position of a major radius of the inner ring from an outer side in the radial direction and
the flange part includes a relief part on an opposite side of the pocket surface in a direction of the axial line from the portion contacting with the rolling element.

2. The ball bearing according to claim 1, wherein
the flange part is configured not to allow the pocket to relatively move with respect to the rolling element at the time of the contact.

3. The ball bearing according to claim 2, wherein
in the ball bearing including the flange part configured to come into contact with the rolling element positioned at at least the position of the minor radius of the inner ring from the inner side in the radial direction,
a radius of the flange part in a cross section orthogonal to the axial line at a predetermined position in the radial direction within a range of the flange part on the axial line and a radius of the rolling element in a cross section orthogonal to a minor axis at the predetermined position in the radial direction of the minor axis of the rolling element positioned at the position of the minor radius of the inner ring have the same value.

4. The ball bearing according to claim 2, wherein
in the ball bearing including the flange part configured to come into contact with the rolling element positioned at at least the position of the major radius of the inner ring from the outer side in the radial direction,
a radius of the flange part in a cross section orthogonal to the axial line at a predetermined position in the radial direction within a range of the flange part on the axial line and a radius of the rolling element in a cross section orthogonal to a major axis at the predetermined position in the radial direction of the major axis of the rolling element positioned at the position of the major radius of the inner ring have the same value.

5. The ball bearing according to claim 1, wherein
the flange part is configured not to allow the pocket, together with the pocket surface, to relatively move with respect to the rolling element at the time of the contact.

6. The ball bearing according to claim 1, wherein
in each of the pockets, the flange part is provided adjacent to the pocket surface at the inner side in the radial direction.

7. The ball bearing according to claim 1, wherein
in each of the pockets, the flange part is provided adjacent to the pocket surface at the outer side in the radial direction.

8. The ball bearing according to claim 1, wherein
the flange part includes a surface extending about the axial line and increasing in diameter toward a side in a direction of contact with the rolling element in the axial direction.

9. The ball bearing according to claim 1, wherein
the flange part continuously protrudes along the pocket surface about the axial line.

* * * * *